United States Patent
Kauffmann

(10) Patent No.: US 9,886,236 B2
(45) Date of Patent: Feb. 6, 2018

(54) MULTI-DIMENSIONAL AUDIO INTERFACE SYSTEM

(71) Applicant: Google Inc., Mountain View, CA (US)

(72) Inventor: Alejandro José Kauffmann, San Francisco, CA (US)

(73) Assignee: Google LLC, Mountain View, CA (US)

( * ) Notice: Subject to any disclaimer, the term of this patent is extended or adjusted under 35 U.S.C. 154(b) by 832 days.

(21) Appl. No.: 14/324,874

(22) Filed: Jul. 7, 2014

(65) Prior Publication Data

US 2015/0348377 A1    Dec. 3, 2015

Related U.S. Application Data

(63) Continuation-in-part of application No. 14/289,203, filed on May 28, 2014, now Pat. No. 9,026,914.
(Continued)

(51) Int. Cl.
*G06F 3/16* (2006.01)
*G06F 3/0481* (2013.01)
(Continued)

(52) U.S. Cl.
CPC ............ *G06F 3/167* (2013.01); *G06F 3/011* (2013.01); *G06F 3/04815* (2013.01);
(Continued)

(58) Field of Classification Search
CPC .......... G06F 3/167; G06F 3/012; G06F 3/013; G06F 9/542; G06F 3/04815;
(Continued)

(56) References Cited

U.S. PATENT DOCUMENTS

| | | |
|---|---|---|
| 6,820,056 B1 | 11/2004 | Harif |
| 7,697,922 B2 | 4/2010 | McQuaide, Jr. et al. |

(Continued)

OTHER PUBLICATIONS

Android Open Source Project—Issue Tracker, Issue 5012—android—Notifications interrupt music playback Android Open Source Project—Issue Tracker—Google Project Housing, https://code.google.com/p/android/issues/detail?id=5012, downloaded on May 28, 2014, 27 pages.
(Continued)

*Primary Examiner* — Nicholas Ulrich
(74) *Attorney, Agent, or Firm* — Shumaker & Sieffert, P.A.

(57) ABSTRACT

In one example, the disclosure is directed to providing a multi-dimensional audio interface in which a plurality of different spatial locations is defined, wherein each of the plurality of different spatial locations is based on a common reference point and is uniquely identifiable by a computing device; associating, by the computing device, an information type with a first spatial location of the plurality of different spatial locations, the information type included in a plurality of different information types; responsive to determining that first information is of the information type, outputting, using an audio output device and simulating localization of sound at the first spatial location, a first sound that indicates the first information; receiving an indication of user input that selects the first information; and performing at least one operation corresponding to the first information selected based at least in part on the indication of user input.

19 Claims, 5 Drawing Sheets

Related U.S. Application Data

(60) Provisional application No. 62/015,811, filed on Jun. 23, 2014.

(51) Int. Cl.
| | | |
|---|---|---|
| *G06F 3/0484* | (2013.01) | |
| *H04S 7/00* | (2006.01) | |
| *G08B 3/10* | (2006.01) | |
| *G06F 3/01* | (2006.01) | |
| *G06F 3/0482* | (2013.01) | |

(52) U.S. Cl.
CPC ........... *G06F 3/04842* (2013.01); *G08B 3/10* (2013.01); *H04S 7/302* (2013.01); *G06F 3/012* (2013.01); *G06F 3/017* (2013.01); *G06F 3/0482* (2013.01)

(58) Field of Classification Search
CPC ............. G06F 3/04842; H04S 2420/01; H04S 2400/11; H04S 7/302; H04L 51/24; H04L 12/1895; H04M 1/72552; H04R 5/033
See application file for complete search history.

(56) References Cited

U.S. PATENT DOCUMENTS

| | | | |
|---|---|---|---|
| 8,380,333 B2 | 2/2013 | Ojala | |
| 8,478,867 B1 | 7/2013 | Queru | |
| 8,630,685 B2 | 1/2014 | Scrage | |
| 8,655,004 B2 | 2/2014 | Prest et al. | |
| 8,923,995 B2* | 12/2014 | Lindahl | G06F 3/167 700/94 |
| 9,026,914 B1 | 5/2015 | Kauffmann | |
| 9,167,368 B2 | 10/2015 | De Jong et al. | |
| 9,367,960 B2* | 6/2016 | Poulos | G06T 19/006 |
| 2003/0018477 A1 | 1/2003 | Hinde | |
| 2009/0097689 A1 | 4/2009 | Prest et al. | |
| 2013/0154930 A1* | 6/2013 | Xiang | G06F 3/167 345/158 |
| 2013/0163765 A1* | 6/2013 | De Jong | H04S 7/304 381/17 |
| 2014/0129937 A1* | 5/2014 | Jarvinen | G06F 3/0487 715/716 |
| 2014/0235169 A1* | 8/2014 | Parkinson | H04W 4/008 455/41.2 |
| 2014/0359450 A1* | 12/2014 | Lehtiniemi | G06F 3/0488 715/727 |

OTHER PUBLICATIONS

Phandroid, Notifications ????—Android Forums, downloaded from https://androidforums.com/samsung-galaxy-note/523428-notifications.html, downloaded on May 28, 2014, 4 pages.
[REQ] Patched Phone.apk for Working Native Voicemail Notifications, Linuxine, http://www.linuxine.com/story/req-patched-phoneapk-working-native-voicemail-notifications, downloaded on May 28, 2014, 2 pages.
My Fourth Descent to ADD, My fourth descent into ADD>>iPhone OS 3.0—First look, https://jordanbalagot.com/blog/2009/03/18/iphone-os-30-first-look/, downloaded on May 28, 2014, 11 pages.
Welcome to the Multimodal Interaction Group Home Page Maintained by Prof. Stephen Brewster, The Glasgow Multimodal Interaction Group HomePage incorporating the Earcons HomePage, http://www.dcs.gla.ac.uk/~stephen/, downloaded on May 28, 2014, 3 pages.
HCI Lecture 12 Sound and User Interfaces, http://www.psy.gla.ac.uk/~steve/HCI/cscln/trail1/lecture12.htm, downloaded on May 28, 2014, 2 pages.
Research projects within the Group, Research done in the Glasgow Multimodal Interaction Group, http://www.dsc.gla.ac.uk/~stephen/research.shtml, downloaded on May 28, 2014, 7 pages.
Providing a structured method for integrating non-speech audio into human-computer interfaces, Thesis Introduction, Earcons, http://www.dcs.gla.ac.uk/~stephen/ThesisIntroAbs/thesisIntro.html, downloaded on May 28, 2014, 12 pages.
Brewster, "Providing a Structured Method for Integrating Non-Speech Audio into Human-Computer Interfaces," http://www.dcs.gla.ac.uk/~stephen, Aug. 1994, 292 pages.
Brewster et al., "Earcons as a Method of Providing Navigational Cues in a Menu Hierarchy," In Proceedings of BCS HCI'96, 1996, 14 pages.
"Structured Menu Presentation Using Spatial Sound Separation," ACM Digital Library, http://dl.acm.org/citation.cfm?id=758126, 2 pages, downloaded on May 28, 2014.
Jeon et al., ""Spindex": Accelerated Intitial Speech Sounds Improve Navigation Performance in Auditory Menus," In Human Factors and Ergonomics Society, 2009, 5 pages.
"Aspect of Music," Aspect of Music—Wikipedia, the free encyclopedia, http://en.wikipedia.org/wiki/Aspect_of_music, downloaded on Apr. 9, 2014, 4 pages.
Technology Reports, "Using Earphones to Perform Gaze Detection for Wearable Interfaces," NTT DOCOMO Technical Journal vol. 12, No. 3, 6 pages, downloaded on May 28, 2014.
New Technology Turns Earphones Into Pulse Wave Sensor, Tech & Industry Analysis from Asia, http://techon.nikkeibp.co.jp/english/NEWS_EN/20131025/311441, Downloaded on May 28, 2014, 2 pages.
Hamanaka et al., "Sound Scope Headphones: Controlling an Audio Mixer through Natural Movement," 2009, 4 pages.
The Dash—Wireless Smart in Ear Headphones, Kickstarter, https://www.kickstarter.com/projects/helobragi/the-dash-wireless-smart-in-ear-headphones, downloaded on May 28, 2014, 23 pages.
Ghomi et al., "Using Rythmic Patterns as an Input Method," Author manuscropt, published in "CHI'12: Proceedings of the SIGCHI Conference on Human Factors and Computing Systems, Austin: United States (2012)" DOI: 10.1145/2207676.2208579, 10 pages.
Sargin, "Analysis of Head Gesture and Prosody-Driven Head-Gesture and Prosody Patterns for Prosody-Driven Head-Gesture Animation," IEEE Transactions on Pattern Analysis and Machine Intellegence, vol. 30, Issue 8, Aug. 2008, 15 pages.
Morency et al., "Head Gestures for Perceptual Interfaces: The Role of Context in Improving Recognition," 2006, 24 pages.
Pantic et al., "Implicit Human-Centered Tagging," Social Sciences, IEEE Signal Processing Magazine, 173, Nov. 2009, 8 pages.
Marentakis, et al., "A Study on Gestural Interaction with a 3D Audio Display," Lecture Notes in Computer Science, Sep. 13, 2004, vol. 3160, pp. 180-191.
Vazquez-Alvarez, "An Investigation of Eyes-Free Spatial Auditory Interfaces for Mobile Devices: Supporting Multitasking and Location-Based Information," Jul. 31, 2013, 175 pp.
International Search Report and Written Opinion from International Application No. PCT/US2015/029661, dated Jul. 29, 2015, 12 pp.
International Preliminary Report on Patentability from International Application No. PCT/US2015/029661, dated Dec. 8, 2016, 9 pp.

* cited by examiner

MULTI-DIMENSIONAL AUDIO INTERFACE SYSTEM

This application is a continuation-in-part of U.S. application Ser. No. 14/289,203, filed May 28, 2014, which is hereby expressly incorporated by reference herein. This application also claims the benefit of U.S. Provisional Application No. 62/015,811, filed Jun. 23, 2014, which is hereby expressly incorporated by reference herein.

BACKGROUND

Computing user interfaces generally receive input entered by a user and output information for consumption by the user. Examples of user interfaces include graphical user interfaces, audio user interfaces, and kinetic user interfaces. Some audio user interfaces may output indications of information to a user in the form of sounds (rather than through visual or kinetic output, for example). However, as the number of indications of information output by a computing device at an audio interface increases, the time and/or effort required by a user to differentiate among these indications may also increase.

SUMMARY

In one example, the disclosure is directed to a method that includes providing a multi-dimensional audio interface in which a plurality of different spatial locations is defined, wherein each of the plurality of different spatial locations is based on a common reference point and is uniquely identifiable by a computing device; associating, by the computing device, an information type with a first spatial location of the plurality of different spatial locations, the information type included in a plurality of different information types; responsive to determining that first information is of the information type, outputting, using an audio output device and simulating localization of sound at the first spatial location of the plurality of different spatial locations, a first sound that indicates the first information; receiving an indication of user input that selects the first information; and performing at least one operation corresponding to the first information selected based at least in part on the indication of user input.

In another example, the disclosure is directed to a computing device comprising at least one processor; and at least one module, operable by the at least one processor to provide a multi-dimensional audio interface in which a plurality of different spatial locations is defined, wherein each of the plurality of different spatial locations is based on a common reference point and is uniquely identifiable by a computing device; associate, for the multi-dimensional audio interface, an information type with a first spatial location of the plurality of different spatial locations, the information type included in a plurality of different information types; responsive to determining that first information is of the information type, output, using an audio output device and simulating localization of sound at the first spatial location of the plurality of different spatial locations, a first sound that indicates the first information; receive an indication of user input that selects the first information; and perform at least one operation corresponding to the first information selected based at least in part on the indication of user input.

In another example, the disclosure is directed to a computer-readable storage medium encoded with instructions that, when executed, cause at least one processor of a computing device to provide a multi-dimensional audio interface in which a plurality of different spatial locations is defined, wherein each of the plurality of different spatial locations is based on a common reference point and is uniquely identifiable by a computing device; associate, for the multi-dimensional audio interface, an information type with a first spatial location of the plurality of different spatial locations, the information type included in a plurality of different information types; responsive to determining that first information is of the information type, output, using an audio output device and simulating localization of sound at the first spatial location of the plurality of different spatial locations, a first sound that indicates the first information; receive an indication of user input that selects the first information; and perform at least one operation corresponding to the first information selected based at least in part on the indication of user input.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
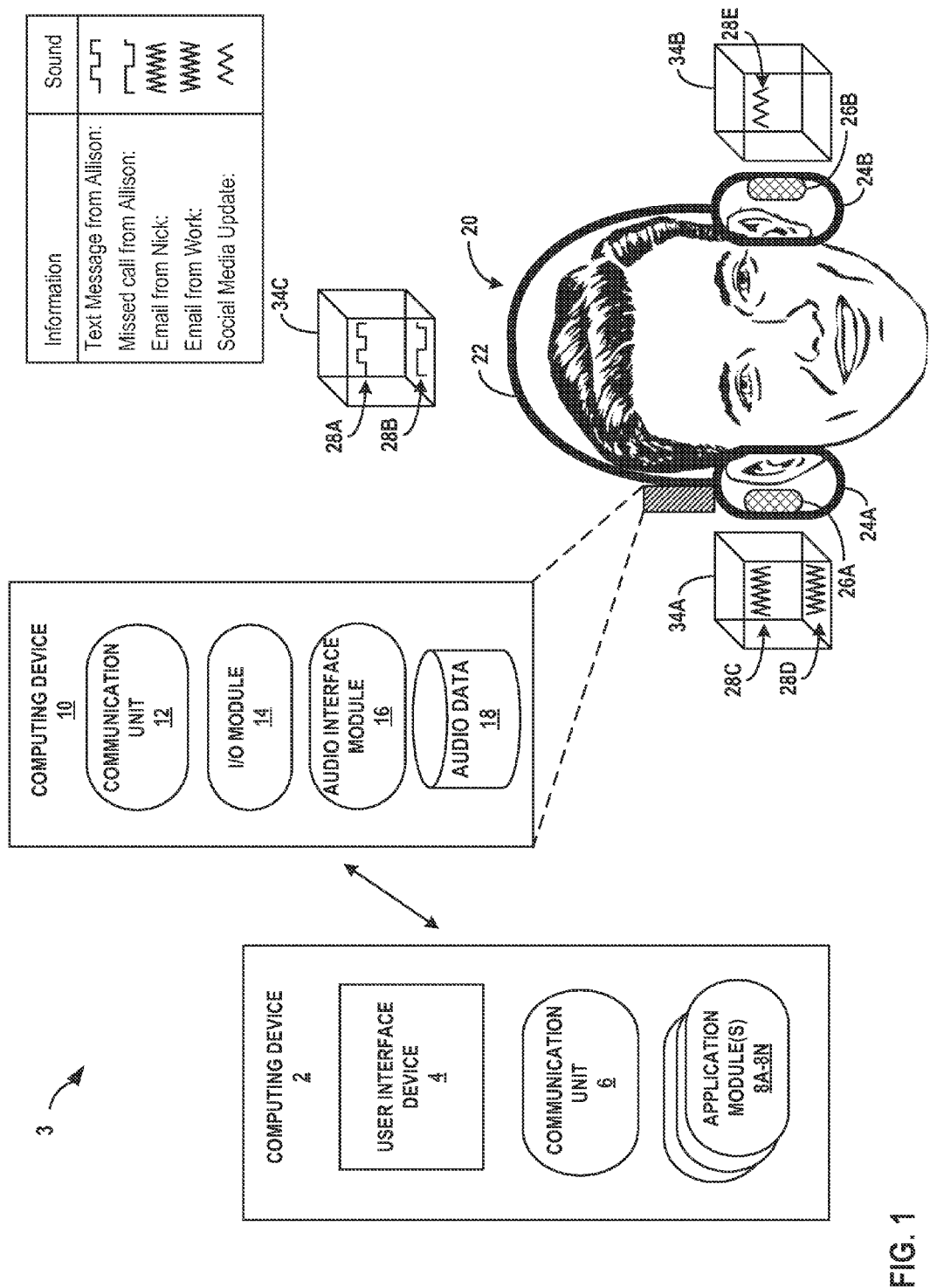
FIG. 1 is a conceptual diagram illustrating an example system including a computing device and wearable apparatus that outputs, in an audio user interface, sounds in various spatial locations, which may indicate one or more relationships between information associated with the sounds, in accordance with one or more aspects of the present disclosure.

In general, this disclosure is directed to techniques for outputting, in an audio user interface, sounds in various "spatial locations." Such techniques may indicate, to a user, one or more relationships between respective information associated with the respective outputted sounds. In some instances, each spatial location may be associated with a distinct information type, such that two or more sounds being output in the same spatial location indicates receipt of two or more indications of information that are of the same information type, originate from the same sender, or share some other characteristic. To illustrate, a wearable apparatus (such as smart headphones, a headband, an earpiece, an eyepiece, or eyeglasses) may include a computing device and one or more audio output devices (e.g., speakers) operatively coupled to the computing device. The computing device of the wearable apparatus may receive multiple, distinct indications of information from one or more remote computing devices (such as a smartphone operatively coupled thereto). Examples of such information may include notifications of email, phone calls, text messages, instant messages, social media, map information, navigation instructions, and calendar events.

Rather than outputting a verbal sound such as "a new text message has arrived from Allison," techniques of the disclosure may enable a computing device of the wearable apparatus to associate a distinct spatial location, relative to the user, at which the computing device may output a non-verbal or a verbal sound based on the received new text message. The wearable apparatus may output an audio notification for the received text message such that the sound appears to emanate from a distinct spatial location with respect to the user. The distinct spatial location may indicate that the sender is Allison. The wearable apparatus may simulate localization of the sound, or output the sound in such a way that a listener would perceive that the sound is emanating from a particular location in space, for a work-related email (i.e., not received from Allison) at a different spatial location than the text message from Allison because the email is unrelated to Allison. In other words, the wearable computing device may simulate localization of sounds indicating information related to Allison at a distinct spatial location, while simulating localization of other sounds indicating information unrelated to Allison at other spatial locations different than the distinct spatial location for information related to Allison. Further, the wearable apparatus may associate another non-verbal sound with a missed call from Allison and may simulate localization of the sound at the same spatial location as the audio notification output for the text message from Allison because the missed call is related to Allison.

Because the two, non-verbal sounds indicating a communication from Allison share a common spatial location, a user of the wearable apparatus may discern that two indications of information have arrived from Allison (e.g., because both sounds appear to emanate from the same spatial location). Alternatively, in instances where the non-verbal sound indicating an incoming email emanates from a spatial location different from the spatial location for information related to Allison, the user of the wearable apparatus may discern that the incoming email is from someone other than Allison. In this way, techniques of the disclosure may provide indications of multiple, distinct indications of information from a plurality of spatial locations, such that a user may quickly and intuitively discern incoming information in an audio interface. Although the example above provides one example of outputting sounds in various spatial locations to indicate a relationship between multiple, distinct indications of information in an audio interface, many other examples of outputting sounds in various spatial locations to indicate a relationship between multiple, distinct indications of information in an audio user interface are possible, as further described below.

FIG. 1 is a conceptual diagram illustrating an example system including a computing device and wearable apparatus that outputs, in an audio user interface, sounds in various spatial locations, which may indicate one or more relationships between information associated with the sounds, in accordance with one or more aspects of the present disclosure. As further described below, outputting multiple sounds at the same spatial location may indicate that two indications of received information are related, and sounds from multiple, different spatial locations may indicate that the two indications of received information are not related by the defined information types. As shown in FIG. 1, system 3 includes computing device 2, wearable apparatus 20, and computing device 10 that is physically coupled to wearable apparatus 20 and communicatively coupled to computing device 2.

Wearable apparatus 20 in the example of FIG. 1 is illustrated as smart headphones, which may be outer-ear headphones. Smart headphones 20 may include a headband 22 that is physically coupled to ear coverings 24A-24B ("ear coverings 24"). Headband 22 may be any suitable semi-flexible and curved material that can rest on a user's head to support ear coverings 24. Ear coverings 24 (or ear muffs) may be comprised of any suitable, rigid or semi-rigid material and formed as substantially half-sphere or conical shapes. As shown in FIG. 1, a portion of each of ear coverings 24 may contact the user's head to enclose each respective ear. For purposes of illustration only, ear coverings 24 are illustrated as transparent to show a user's ears within the ear covers and, audio output devices, for example, speakers 26A-26B affixed within the ear coverings. Audio output devices, such as speakers 26, may be any output device that outputs sound. Speakers 26A-26B ("speakers 26") may be operatively coupled to computing device 10, such that computing device 10 may control sound output at one or more of speakers 26. Speakers 26 may receive information from computing device 10 and output the information as sound.

For purposes of illustration, techniques of the disclosure are described with respect to wearable apparatus 20 as smart headphones. However, techniques of the disclosure may also be implemented in, but not limited to: in-vehicle automotive audio systems, optical head-mounted computing devices, in-ear headphones (such as ear buds), ear-mounted computing devices, wrist-mounted computing devices (such as smart watches), stationary and/or semi-fixed audio systems (such as a conference room or household room audio system), etc.

Wearable apparatus 20 may also include, be affixed to, or integrated with computing device 10. Computing device 10 may include one or more processors and memory as further illustrated in FIG. 2. In some examples, computing device 10 may be designed as a miniature form-factor computing device that is integrated with, included in, or attached to wearable apparatus 20. In some examples, a miniature form factor computing device may fit within dimensions of four inches wide, by four inches deep, by four inches long. In some examples, a miniature form factor computing device may be characterized by a size that does not substantially encumber a user that is wearing the wearable apparatus to which the miniature form factor computed device is affixed.

In some examples, computing device 10 may include a communication unit 12, input/output (I/O) module 14, audio interface module 16, and audio data 18. Communication unit 12 may send and/or receive data with one or more computing devices. In some examples, communication unit 12 supports wireless and/or wired communication. Communication unit 12 may send and/or receive data using any variety of communication protocols. Further details of communication unit 12 are provided in FIG. 2.

Computing device 10 may also include I/O module 14. I/O module 14 may send information to speakers 26 that is received from other components of computing device 10, such as audio interface module 16, communication unit 12, audio data 18, etc., or any other components communicatively coupled to computing device 10. A component may be any hardware, software, firmware, and/or information. I/O module 14 may also receive information from a component (e.g., an input device) of computing device 10, wearable apparatus 20, or any other components communicatively coupled to computing device 10, and send the information to another component of computing device 10. Generally, I/O module 14 may facilitate the transmission of information between components included in computing device 10, wearable apparatus 20, or any other components communicatively coupled to computing device 10.

In some examples, computing device 10 may also include an audio interface module 16. Audio interface module 16 may implement techniques for outputting, in an audio user interface, multiple sounds in various spatial locations, which may indicate one or more relationships between information associated with the sounds. In some examples, audio interface module 16 may generate, maintain, and control an audio interface that presents and/or receives information from a user. Audio interface module 16 is further described below in the examples of this disclosure. Computing device 10 may include more or fewer components than shown in the example of FIG. 1. For instance, computing device 10 may include, but is not limited to, one or more input devices, output devices, sensors, power sources (e.g., batteries), etc.

Modules 14 and 16 may perform operations described herein using software, hardware, firmware, or a mixture of both hardware, software, and firmware residing in and/or executing on computing device 10. Computing device 10 may execute modules 14 and 16 with one or more processors. Computing device 10 may execute any of modules 14 and 16 as or within a virtual machine executing on underlying hardware. Modules 14 and 16 may be implemented in various ways. For example, any of modules 14 and 16 may be implemented as a downloadable or pre-installed application or "app." In another example, any of modules 14 and 16 may be implemented as part of an operating system of computing device 10.

Computing device 10 may store audio data 18. Audio data 18 may include one or more representations of different sounds. A representation of sound may be a file or other suitable structured data stored on and/or streamed to computing device 10, that when processed causes one or more of speakers 26 to output the sound. As further described herein, audio interface module 16 may associate a sound with specific information, and output such sound.

Computing device 10 may send and/or receive information with other computing devices, such as computing device 2. In the example of FIG. 1, computing device 2 may be a smartphone. However, in other examples, computing device 2 may include, but is not limited to, a tablet computer, a personal digital assistant (PDA), a laptop computer, a portable gaming device, a portable media player, an e-book reader, a watch, television platform, server device, in-vehicle automotive audio system, wearable computing device (e.g., optical head-mounted computing device, in-ear headphones, ear-mounted computing devices, wrist-mounted computing devices, stationary), and/or semi-fixed audio systems (such as a conference room or household room audio system). Computing device 2 may also send and/or receive information with one or more computing devices other than computing device 10. Examples of such one or more computing devices may be any computing device described as an example of computing device 2.

Computing device 2, as shown in FIG. 1, may include a user interface device 4, communication unit 6, and one or more application modules 8A-8N ("application modules 8").

User interface device 4 of computing device 2 may function as an input device and/or as an output device for computing device 2. In some examples, user interface device 4 may include an integrated presence-sensitive input device and a display device. For instance, user interface device 4 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. User interface device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 2.

User interface device 4 of computing device 2 may include a presence-sensitive screen that may detect user input from a user of computing device 2. User interface device 4 may receive indications of the user input by detecting one or more tap and/or non-tap gestures, continuous gestures, or other any multi-touch gestures from a user of computing device 2 (e.g., the user touching or pointing to one or more locations of user-interface device 4 with a finger or a stylus pen). A presence-sensitive screen of user interface device 4 may present output to a user. For instance, a presence-sensitive screen of user interface device 4 may present various graphical user interfaces of applications (e.g., an electronic message application, an Internet browser application) executing at computing device 2. A user of computing device 2 may provide user input at user interface device 4 to interact with one or more of these applications.

As shown in FIG. 1, computing device 2, in some examples, includes one or more application modules 8. Application modules 8A-8N ("application modules 8") may include functionality to perform any variety of operations on computing device 2. For instance, application modules 8 may include an phone call manager application, email application, text messing application, instant messaging application, weather application, video conferencing application, social networking application, weather application, stock market application, emergency alert application, sports application, news application, office productivity application, multimedia player, to name only a few examples.

Like computing device 10, computing device 2 may include a communication unit 6, Communication unit 6 may send and/or receive data with one or more computing devices. In some examples, communication unit 6 supports wireless and/or wired communication. Communication unit 6 may send and/or receive data using any variety of communication protocols. Further details of communication unit 6 are provided in FIG. 2

Modules 8 may perform operations described herein using software, hardware, firmware, or a mixture of both hardware, software, and firmware residing in and/or executing on computing device 2. Computing device 2 may execute modules 8 with multiple processors. Computing device 2 may execute any of modules 8 as or within a virtual machine executing on underlying hardware. Modules 8 may be implemented in various ways. For example, any of modules 8 may be implemented as a downloadable or pre-installed application or "app." In another example, any of modules 8 may be implemented as part of an operating system of computing device 10.

Rather than outputting verbal indications of multiple, distinct indications of information (e.g., "a new text message has arrived from Allison" followed by "an email from work"), techniques of the disclosure may output verbal or non-verbal sounds indicating information of the same information type in the same spatial location and may output verbal or non-verbal sounds indicating information of different information types in distinct spatial locations. In other words, whenever information of a specific first information type is received, a sound will be output from a first spatial location to indicate that information of that first information type has been received. On the other hand, if information of a different information type is received, a sound will be output from a second, different spatial location to indicate that information of an information type different from the first information type has been received. In this way, techniques of the disclosure may provide indications of multiple, distinct information in a variety of spatial locations, such that a user may quickly and intuitively interact with an audio interface. The techniques are now further described in detail with reference to FIG. 1.

In accordance with techniques of this disclosure, audio interface module 16 may provide a multi-dimensional audio interface in which a plurality of spatial locations 34A-34C is defined that enables a user to interface with computing device 10. An audio interface, generally, may maintain, organize, and/or provide information to a user using one or more sounds. In some examples, an audio interface may also receive user input in the form of sounds, such as spoken input; however, user input may also be received through tactile, kinetic, or other suitable forms of user input. The audio interface may be implemented using one or more data structures, processes, and/or hardware included at one or more of computing device 10, computing device 2, and/or other computing devices. In the example of FIG. 1, audio interface module 16 may implement such data structures and processes to provide the audio interface. Any suitable data structures may be used including, but not limited to, arrays, tables, maps, objects (that include data and operations), etc. Audio interface module 16 may maintain state for different sounds and information, maintain associations between information and sounds, and perform operations including operations on such sounds, information, and associations.

In some examples, each of the plurality of spatial locations 34A-34C may be based on a common reference point and may be uniquely identifiable by computing device 10. In one example, the plurality of spatial locations 34A-34C may be arranged such that spatial location 34A may be identified as a location directly to the right of a user's head, spatial location 34B may be identified as a location directly to the left of the user's head, and spatial location 34C may be identified as a location directly above the user's head. In other examples, the plurality of spatial locations may be at other angles, such as forty-five degrees right, left, or above center. In some examples, the common reference point may be computing device 10, while in other examples the common reference point may be other than computing device 10.

In some examples, computing device 10 may receive data from one or more other computing devices, such as computing device 2. For instance, communication unit 12 may receive from communication unit 6, data indicating an email received at computing device 2. As another example, communication unit 12 may receive from communication unit 6, data indicating that a phone call was missed at computing device 2. Upon receiving the data from communication unit 12, audio interface module 16 may determine information included in the data. Generally, information may represent or indicate one or more facts. Examples of information may include but are not limited to an instant message, a text message, a social media communication, a missed call, a voicemail, a calendar event, a location, a navigation instruction, a news event, a weather event, or any meta-data or content of such examples of information.

Audio interface module 16 may determine and/or select information at distinct levels of granularity. For instance, audio interface module 16 may determine as information that the sender of a text message is "Allison." In another example, audio interface module 16 may determine as information, "an email was received from work"—that is, the information indicates both that there was an email received and that the sender was from a domain of the user's work. Thus, in some examples, information may represent a collection of multiple indications of information. Conversely, in some examples, information may represent an indication of information within a collection of information. In this way, audio interface module 16 may associate different sounds, having a shared spatial location, with different, but related indications of information (e.g., respective sounds for a missed call from Allison and a text message from Allison having the same tone, but different tempo, or having different sounds altogether).

Computing device 2 may define one or more information types. In general, an information type may be a grouping based on the sender or the method of communication. In some examples, an information type could be a sender identification for the information, such as from a spouse, a child, a friend, a place of business, or a parent, among other things. In other examples, an information type could be a content identification for the information, such as an indication that the information is an instant message, a text message, a social media communication, a missed call, a voicemail, a calendar event, a location, a navigation instruction, a news event, a weather event, or any meta-data or content of such examples of information. In other examples, the information type may be a combination of the above information types. Information types may be predefined, or they may be customizable by the user. Computing device 2 may further associate each information type with a distinct spatial location. Computing device 2 may further store the information types and the associated distinct spatial location for reference by audio interface module 16.

In accordance with techniques of the disclosure, audio interface module 16 may associate, in the audio interface, an information type with a first spatial location 34C of the plurality of spatial locations 34A-34C, the information type included in a plurality of information types. In the example of FIG. 1, the information type may be communications from a sender named Allison. In this example, audio interface module 16 may associate, in the audio interface, all communications from a sender named Allison with first spatial location 34C directly above the user's head. Other information types in FIG. 1 may include all e-mail communications, which is associated with spatial location 34A directly to the right of the user's head, and all social network communications, which is associated with spatial location 34B directly to the left of the user's head.

Computing device 2 may receive first information and determine that first information is of the first information type. In the example of FIG. 1, the first information may be a new text message from a sender Allison. Computing device 2 may have received the text message and sent data to computing device 10 indicating the new text message from the sender Allison. Based on the method of communication (i.e., text message) and the sender (i.e., Allison), computing device 2 may determine an information type for the text message from Allison. In this example, since one information type is "communications from Allison", computing device 2 may determine that the first information is of that information type, as the sender of the first information is Allison. Responsive to determining that the first information is of the first information type, audio interface module 16 may determine a first sound 28A from audio data 18, and store data that indicates an association between the first information and first sound 28A. Audio interface module 16 may also determine the spatial location associated with the information type of the first information by referencing the stored information type and spatial location associations stored by computing device 2. In the example of FIG. 1, a text message from Allison is of the information type "communications from a sender named Allison," which is associated with spatial location 34C. Therefore, audio interface module 16 may determine that spatial location 34C is associated with the first information. As shown in FIG. 1, first sound 28A is represented visually; however, the visual representation of first sound 28A is for example purposes only and may not necessarily indicate the actual perceptual properties of first sound 28A. First sound 28A may be characterized by one or more perceptual properties.

A sound, such as any of sounds 28A-28E, may be verbal or non-verbal. A sound that is verbal may include one or more words of a language that are output in audio form. A sound that is non-verbal does not include one or more words of a language, but is output in audio form. A non-verbal sound may be anthropomorphic, such that the non-verbal sound does not include words of a language but sounds as though generated by a human (e.g., humming, clicking, swishing, rasping, or any other wordless tone). A perceptual property may be any quality of a sound that changes its audio form when output. Examples of perceptual properties may include but are not limited to: a melody, a harmony, a rhythm, a tone, a form, a tempo, dynamics, a pitch, a timbre, an intensity, and a duration of the respective first sound or second sound. A sound may have one or more perceptual properties. In some examples, a perceptual property may be perceptible by a human. In some examples, all sounds output by speakers 26 may have the same perceptual properties and may vary based solely on the spatial location from which the sound comes. In other examples, sounds output by speakers 26 in the same spatial location may have the same perceptual properties, and sounds output by speakers 26 in distinct spatial locations may have one or more distinct perceptual properties. In other examples, sounds output by speakers 26 within the same spatial location may have one or more distinct perceptual properties based on further information types or classifications of the information received.

In the example of FIG. 1, one or more of speakers 26 may output the first sound 28A that indicates the first information in the audio interface by simulating localization of sound at the first spatial location 34C of the plurality of different spatial locations 34A-34C. For instance, audio interface module 16 may cause I/O module 14 to send first sound 28A to speakers 26 for output. In some examples, audio interface module 16 may cause I/O module 14 to send one or more sounds for output based on an event. An event may be, but not limited to, a timer expiration, an asynchronous machine-driven event (e.g., a notification for new incoming information), or a user-driven event (e.g., a user provides an input to request output from the audio user interface).

In some examples, audio interface module 16 may specify control data to control which of speakers 26 will output which particular sounds. For instance, audio interface module 16 may implement techniques for providing stereophonic sound, which may include multiple different channels through which different sounds may be output. Audio interface module 16 may implement techniques for providing three-dimensional sound, in which speakers 26 may, when outputting a sound, simulate localization of the sound at the one of the plurality of spatial locations that is defined based on a reference point. For instance, audio interface module 16 may send information to I/O module 14, that causes speakers 26 to simulate localization of the sound at spatial location 34C relative to a reference point when a communication from a sender named Allison. In some examples, the reference point may be a user's head, while in other examples the reference point may be a location other than the user's head, such as computing device 10. One or more of audio interface module 16, I/O module 14, and/or speakers 26 may maintain information that define the one or more spatial locations, such that audio interface module 16, I/O module 14, and/or speakers 26 can specify to which spatial location a sound will be output.

I/O module 14, upon receiving indications of one or more sounds, and in some examples control data, may cause speakers 26 to output sounds 28A-28E at their respective spatial locations 34A-34C. In the example of FIG. 1, I/O module 14 causes sounds 28C and 28D to be output at spatial location 34A on the right-hand side of the user's face, as both sounds 28C and 28D are indications of emails, which is of the information type associated with spatial location 34A. I/O module 14 causes sound 28E to be output at spatial location 34B on the left-hand side of the user's face, as sound 28E is an indication of a social network communication, which is of the information type associated with spatial location 34B. I/O module 14 causes sounds 28A and 28B to be output at spatial location 34C directly above the user's face, as sounds 28A and 28B are communications from a sender named Allison, which is of the information type associated with spatial location 34C. Although three spatial locations are addressable by I/O module 14 in the example of FIG. 1, any number of spatial locations may be defined to simulate localization of sound at different spatial locations relative to a common reference point based on various information types. I/O module 14 may define spatial locations at any location in a three-dimensional space. For purposes of illustration only, spatial locations 34A-34C are illustrated with lines to illustrate approximate boundaries of the simulated localized sound, and such lines are not visible in operation to a user. Furthermore, the size of spatial locations 34A-34C are for purposes of illustration only and may be larger and or smaller that shown in FIG. 1.

In some examples, I/O module 14 may cause speakers 26 to output sounds 28A-28E in parallel. Outputting two or more sounds in parallel may include outputting the two or more sounds such that the output of one sound at least partially overlaps with another sound. In some examples, outputting two or more sounds sequentially may include outputting at least two sounds successively such that the output of the two sounds do not overlap. Outputting two or more sounds in parallel may not include outputting two or more sounds sequentially.

By outputting sounds 28A-28E in parallel, a user of wearable apparatus 20 may determine multiple distinct indications of information at the same or substantially the same time. In some examples, wearable apparatus 20 may determine multiple distinct indications of information at the same or substantially the same time during a particular duration of time. In some examples, the particular duration of time may be defined by one or more values stored or accessed by the computing device. The relationship between first information and second information (e.g., missed call from Allison) in the example of FIG. 1 may be perceptible to the user in the audio interface based at least in part on the differing spatial locations of the respective first and second sounds. That is, continuing with the non-limiting example above, a user of wearable apparatus 20 may be able to determine that both a text message from Allison and missed call from Allison were received because the tone of each of sounds 28A and 28D are output from the same spatial location, 34C. In this way, the shared spatial location indicates the relationship between the first information and the second information of sharing a common information type, while distinct perceptual properties allow the user to decipher between the email and missed to determine that both types of information are present.

Audio interface module 16 may receive an indication of user input that selects the first information, which is associated with first sound 28A. Based on hearing sound 28A through speakers 26, the user may select the sound to receive additional detail about the information indicated by the sound. Audio interface module may receive one or more indications of user input from I/O module 14, which may receive data from input devices, sensors, etc. of computing device 10. User input may include, but is not limited to touch, kinetic, audio, optical, and/or other suitable forms of user input. In the example of FIG. 1, audio interface module 16 may receive an indication of user input that the user has turned his head in an upward direction toward spatial location 34C. Computing device 10 may determine, based on the indication of user input, to select information indicating the text message from Allison based on the head turn upwards in the direction of first sound 28A associated with the text message from Allison.

In accordance with techniques of the disclosure, computing device 10 may perform, based at least in part on the indication of user input, at least one operation corresponding to the first information. For example, audio interface module 16 may select information associated with the sound based on the user input. For instance, audio interface module 16 may send data to I/O module 14 that causes speakers 26 to output verbal sound that includes a transcript of the text message from Allison and/or metadata about the text message, such as date received, date sent, subject, recipient(s), sender, etc.

In general, an operation may refer to any one or more actions that can be taken by one or more of computing device 10, computing device 2 and/or other computing devices. An operation may perform actions including but not limited to loading data, storing data, transmitting and/or outputting data, transforming data. Example operations may include, but are not limited to: outputting information (e.g., verbal and/or non-verbal sound, graphical output, haptic/kinetic output, etc.), sending and/or receiving data with another device, navigating through a hierarchical audio interface, receiving user input (e.g., verbal and/or non-verbal sound, visual input, haptic/kinetic input, etc.), executing/starting/stopping one or more applications.

Figure 2:
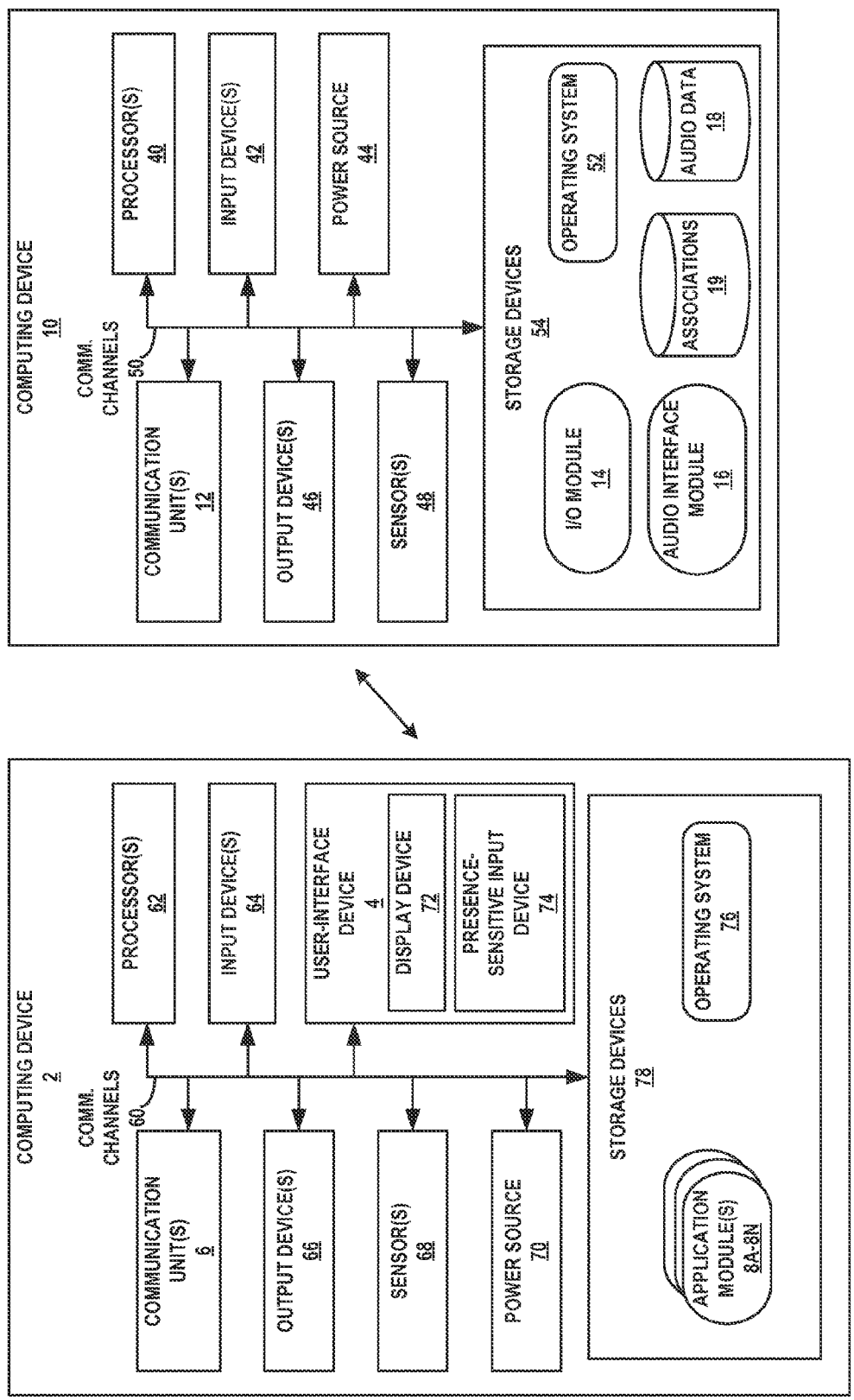
FIG. 2 is a block diagram illustrating two example computing devices, in accordance with one or more aspects of the present disclosure.

FIG. 2 is a block diagram illustrating two example computing devices, in accordance with one or more aspects of the present disclosure. FIG. 2 illustrates only two particular examples of computing device 2 and computing device 10 (as also illustrated in FIG. 1), and many other examples of computing device 2 and computing device 10 may be used in other instances and may include a subset of the components included in example computing device 2 and computing device 10 or may include additional components not shown in FIG. 2.

As shown in the example of FIG. 2, computing device 2 includes one or more processors 62, one or more input devices 64, one or more communication units 6, one or more output devices 66, one or more storage devices 78, and user-interface device 4. Storage devices 78 of computing device 2 also includes operating system 76 and application modules 8A-8N. Communication channels 60 may interconnect each of the components 4, 6, 8, 62, 64, 66, 68, 70, 76, and 78 for inter-component communications (physically, communicatively, and/or operatively). In some examples, communication channels 60 may include a system bus, a network connection, one or more inter-process communication data structures, or any other components for communicating data between hardware and/or software.

One or more input devices 64 of computing device 2 may receive input. Examples of input are tactile, audio, kinetic, and optical input. Input devices 64 of computing device 2, in one example, include a mouse, keyboard, voice responsive system, video camera, buttons, control pad, microphone or any other type of device for detecting input from a human or machine. In some examples, input device 64 may be a presence-sensitive input device, which may include a presence-sensitive screen, touch-sensitive screen, etc.

One or more output devices 66 of computing device 2 may generate output. Examples of output are tactile, audio, and video output. Output devices 66 of computing device 2, in one example, include a presence-sensitive screen, sound card, video graphics adapter card, speaker, cathode ray tube (CRT) monitor, liquid crystal display (LCD), or any other type of device for generating output to a human or machine. Output devices 66 may include display devices such as cathode ray tube (CRT) monitor, liquid crystal display (LCD), or any other type of device for generating tactile, audio, and/or visual output.

One or more communication units 6 of computing device 2 may communicate with external devices by transmitting and/or receiving data. For example, computing device 2 may use communication unit 6 to transmit and/or receive radio signals on a radio network such as a cellular radio network. In some examples, communication units 6 may transmit and/or receive satellite signals on a satellite network such as a Global Positioning System (GPS) network. Examples of communication unit 6 include a network interface card (e.g. such as an Ethernet card), an optical transceiver, a radio frequency transceiver, a GPS receiver, or any other type of device that can send and/or receive information. Other examples of communication units 6 may include Bluetooth®, GPS, 3G, 4G, and Wi-Fi® radios found in mobile devices as well as Universal Serial Bus (USB) controllers and the like.

In some examples, user-interface device 4 of computing device 2 may include functionality of input devices 64 and/or output devices 66. In the example of FIG. 2, user-interface device 4 may include a presence-sensitive input device 74, such as a presence-sensitive screen or touch-sensitive screen. In some examples, presence sensitive input device 74 may detect an object at and/or near the presence-sensitive input device. As one example range, presence-sensitive input device 74 may detect an object, such as a finger or stylus that is within 2 inches or less of presence-sensitive input device 74. Presence-sensitive input device 74 may determine a location (e.g., an (x,y) coordinate) of the presence-sensitive input device at which the object was detected. In another example range, presence-sensitive input device 74 may detect an object 6 inches or less from presence-sensitive input device 74 and other ranges are also possible. Presence-sensitive input device 74 may determine the location of presence-sensitive input device 74 selected by a user's finger using capacitive, inductive, and/or optical recognition techniques.

In some examples, user-interface device 4 may also provide output to a user using tactile, audio, or video stimuli as described with respect to output device 66. For instance, user-interface device 4 may include display device 72 that presents a graphical user interface. Display device 72 may be any type of output device that provides visual output, such as described with respect to output devices 66. While illustrated as an integrated component of computing device 2, user-interface device 4 may, in some examples, be an external component that shares a data path with other components of computing device 2 for transmitting and/or receiving input and output. For instance, user-interface device 4 may be a built-in component of computing device 2 located within and physically connected to the external packaging of computing device 2 (e.g., a screen on a mobile phone). In another example, user-interface device 4 may be an external component of computing device 2 located outside and physically separated from the packaging of computing device 2 (e.g., a monitor, a projector, etc. that shares a wired and/or wireless data path with a tablet computer). In some examples, user-interface device 4, when located outside of and physically separated from the packaging of computing device 2, may collectively refer to two components: a presence-sensitive input device for receiving input and a display device for providing output.

One or more storage devices 78 within computing device 2 may store information for processing during operation of computing device 2. In some examples, storage device 78 is a temporary memory, meaning that a primary purpose of storage device 78 is not long-term storage. Storage devices 78 on computing device 2 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 78, in some examples, also include one or more computer-readable storage media. Storage devices 78 may be configured to store larger amounts of information than volatile memory. Storage devices 78 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 78 may store program instructions and/or data associated with operating system 76 and application modules 8A-8N.

As shown in FIG. 2, computing device 2 may include one or more sensors 68. Sensors 68 may include an accelerometer that generates accelerometer data. Accelerometer data may indicate an acceleration and/or a change in acceleration of computing device 2. Sensors 68 may include a gyrometer that generates gyrometer data. Gyrometer data may indicate a physical orientation and/or change in physical orientation of computing device 2. In some examples, the orientation may be relative to one or more reference points. Sensors 68 may include a magnetometer that generates magnetometer data. Magnetometer data may indicate the magnetization of an object that is touching or in proximity to computing device 2. Magnetometer data may indicate the Earth's magnetic field, and in some examples, provide directional functionality of a compass. Sensors 68 may include an ambient light sensor that generates ambient light data. The ambient light data may indicate an intensity of light to which computing device 2 is exposed. Sensors 68 may include a proximity sensor that generates proximity data. Proximity data may indicate whether an object is within proximity to computing device 68. In some examples, proximity data may indicate how close an object is to computing device 2. In some examples, sensors 68 may include a clock that generates a date and time. The date and time may be a current date and time.

As shown in FIG. 2, computing device 2 may include a power source 70. In some examples, power source 70 may be a battery. Power source 70 may provide power to one or more components of computing device 2. Examples of power source 70 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 70 may have a limited capacity (e.g., 1000-3000 mAh).

One or more processors 62 may implement functionality and/or execute instructions within computing device 2. For example, processors 62 on computing device 2 may receive and execute instructions stored by storage devices 78 that provide the functionality of operating system 76, and application modules 8A-8N. These instructions executed by processors 62 may cause computing device 2 to store and/or modify information, within storage devices 78 during program execution. Processors 62 may execute instructions of operating system 76 and application modules 8A-8N to perform one or more operations. That is, operating system 76 and application modules 8A-8N may be operable by processors 62 to perform various functions described herein.

As shown in the example of FIG. 2, computing device 10 includes one or more processors 40, one or more input devices 42, one or more communication units 12, one or more output devices 46, one or more storage devices 54. Storage devices 54 of computing device 2 also includes operating system I/O module 14, audio interface module 16, operating system 52, and audio data 18. Communication channels 50 may interconnect each of the components 12, 40, 42, 44, 46, 48, 54, 14, 16, 52, and 18 for inter-component communications (physically, communicatively, and/or operatively). In some examples, communication channels 50 may include a system bus, a network connection, one or more inter-process communication data structures, or any other components for communicating data between hardware and/or software.

One or more input devices 42 of computing device 10 may receive input. Examples of input are tactile, audio, kinetic, and optical input. Input devices 42 of computing device 10, in one example, include a mouse, keyboard, voice responsive system, video camera, microphone, buttons, control pad, or any other type of device for detecting input from a human or machine. In some examples, input device 64 may be a presence-sensitive input device, which may include a presence-sensitive screen or touch-sensitive screen.

One or more output devices 46 of computing device 10 may generate output. Examples of output are tactile, audio, and video output. Output devices 46 of computing device 10, in one example, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating tactile, audio, and/or visual output.

One or more communication units 12 of computing device 10 may communicate with external devices by transmitting and/or receiving data. For example, computing device 10 may use communication unit 12 to transmit and/or receive radio signals on a radio network such as a cellular radio network. In some examples, communication units 12 may transmit and/or receive satellite signals on a satellite network such as a GPS network. Examples of communication unit 12 may include a network interface card (e.g. such as an Ethernet card), an optical transceiver, a radio frequency transceiver, a GPS receiver, or any other type of device that can send and/or receive information. Other examples of communication units 12 may include Bluetooth®, GPS, 3G, 4G, and Wi-Fi® radios found in mobile devices as well as Universal Serial Bus (USB) controllers and the like.

One or more storage devices 54 within computing device 10 may store information for processing during operation of computing device 10. In some examples, storage device 54 is a temporary memory, meaning that a primary purpose of storage device 54 is not long-term storage. Storage devices 54 on computing device 10 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 54, in some examples, also include one or more computer-readable storage media. Storage devices 54 may be configured to store larger amounts of information than volatile memory. Storage devices 54 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 54 may store program instructions and/or data associated with I/O module 14, audio interface module 16, operating system 52, and audio data 18.

As shown in FIG. 2, computing device 10 may include one or more sensors 48. Sensors 48 may include an accelerometer that generates accelerometer data. Accelerometer data may indicate an acceleration and/or a change in acceleration of computing device 10. Sensors 48 may include a gyrometer that generates gyrometer data. Gyrometer data may indicate a physical orientation and/or change in physical orientation of computing device 10. In some examples, the orientation may be relative to one or more reference points. Sensors 48 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 48 may include an ambient light sensor that generates ambient light data. The ambient light data may indicate an intensity of light to which computing device 10 is exposed. Sensors 48 may include a proximity sensor that generates proximity data. Proximity data may indicate whether an object is within proximity to computing device 48. In some examples, proximity data may indicate how close an object is to computing device 10. In some examples, sensors 48 may include a clock that generates a date and time. The date and time may be a current date and time.

As shown in FIG. 2, computing device 10 may include a power source 44. In some examples, power source 44 may be a battery. Power source 44 may provide power to one or more components of computing device 10. Examples of power source 44 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 44 may have a limited capacity (e.g., 1000-3000 mAh).

One or more processors 44 may implement functionality and/or execute instructions within computing device 10. For example, processors 40 of computing device 10 may receive and execute instructions stored by storage devices 54 that provide the functionality of I/O module 14, audio interface module 16, operating system 52, and audio data 18. These instructions executed by processors 40 may cause computing device 10 to store and/or modify information, within storage devices 54 during program execution. Processors 40 may execute instructions of I/O module 14, audio interface module 16, operating system 52, and audio data 18 to perform one or more operations. That is, I/O module 14, audio interface module 16, operating system 52, and audio data 18 may be operable by processors 40 to perform various functions described herein.

In accordance with techniques of the disclosure, an information type, as described in FIG. 1, may indicate one of a sender identification or a content identification. Audio interface module 16 may determine that received information is of an information type. In some examples, audio interface module 16 may determine a source characteristic for the first information, wherein the source characteristic indicates at least one of a sender identification or a content identification. In the example of FIG. 1, the first information (i.e., text message from Allison) has a sender identification (Allison) and a content identification (text message). Audio interface module 16 may compare the source characteristic of the first information to a plurality of information types that includes the information type, at least one of the plurality of information types indicating at least one of the sender identification or the content identification and determining that the first information is of the information type based at least in part on the comparison. For example, the example of FIG. 1 has three possible information types (communications from Allison, emails, and social media communications). Audio interface module 16 may compare the source characteristic of the first information (i.e., text message and a communication from Allison) to the plurality of information types in order to determine the information type of the first information. Since the source characteristic includes a communication from Allison, which is the same as an information type in the plurality of information types, audio interface module 16 may determine that the first information is of the information type associated with communications from Allison.

In accordance with techniques of the disclosure, communication unit 12 may receive, in a non-limiting example, data indicating a missed telephone call from computing device 2, which may use communication unit 6 to send the data. Application module 8A, for example, may determine an incoming telephone call was missed, which communication unit 6 sends to communication unit 12 as data. Upon receiving the data from communication unit 12, audio interface module 16 may determine information included in the data.

In the example of FIG. 2, audio interface module 16 may determine second information that indicates a missed telephone call from Allison, who was also the sender of the text message in FIG. 1. Similar to the process outlined in FIG. 1, audio interface module may determine that the second information is of the same information type associated with the first spatial location. Audio interface module 16 may also associate, for the audio interface, a second sound with the second information. Responsive to this determining that the second information is of the first information type, an audio output device, such as speakers 26 of FIG. 1, may output, simulating localization of sound at the first spatial location 34C of the plurality of different spatial locations, the second sound that indicates the second information. The second sound may indicate second information and be characterized by a second plurality of perceptual properties to indicate the type of communication received. For instance, in some examples, different methods of communication may be characterized by sounds with a distinct plurality of perceptual properties.

Conversely, in the example of FIG. 2, audio interface module 16 may receive second information that indicates an email from work. An email from work would not be of the first information type, as it is not a communication from Allison. Thus, audio interface module 16 may determine that the second information is of a second information type (i.e. emails) of the plurality of different information types. Audio interface module 16 may further associate the second information type (i.e. emails) of the plurality of different information types with a second spatial location 34A of the plurality of different spatial locations. Audio interface module 16 may also associate, for the audio interface, a second sound with the second information. Responsive to this determining that the second information is of the second information type, an audio output device, such as speakers 26 of FIG. 1, may output, simulating localization of sound at the second spatial location 34A of the plurality of different spatial locations, the second sound that indicates the second information. The second sound may indicate second information and be characterized by a second plurality of perceptual properties to indicate the type of communication received. For instance, in some examples, different methods of communication may be characterized by sounds with a distinct plurality of perceptual properties.

For instance, audio interface module 16 may cause I/O module 14 to send the first, second, third, and fourth sounds to the speakers for output. As in the example of FIG. 1, the third sound may indicate one or more social media updates. In some examples, audio interface module 16 may cause I/O module 14 to send one or more sounds for output based on an event. For instance, one of input devices 42 may have received an indication of user input to request output of information in the audio interface.

In the example of FIG. 2, audio interface module 16 sends indications of the first, second, third, and fourth sounds to I/O module 14. I/O module 14 upon receiving indications of one or more sounds may cause one or more of output devices 46 (e.g., speakers 26) to output the first and second sounds. In the example of FIG. 2, I/O module 14 may cause output devices 46 to output the first and second sounds in the same spatial location or in different spatial locations, as described in FIG. 1.

Techniques of the disclosure may be performed using any suitable computing device configuration. For instance, as shown in FIGS. 1-2, computing device 10 may receive information from computing device 2 and perform techniques of the disclosure as described in FIGS. 1-2. In some examples, computing device 2 may be a portable computing device in proximity to computing device 10 (e.g., within a maximum range of Bluetooth, Near Field Communication, or WiFi communication), while in other examples computing device 2 may be a remote computing device, such as a server, that is not in proximity to computing device 10 (e.g., outside of the maximum range of Bluetooth, Near Field Communication, or WiFi communication). In any case, techniques of the disclosure may be distributed and/or divided across multiple computing devices. For instance, one or more operations of computing device 10 as described in this disclosure may be performed at computing device 2, rather than at computing device 10, and similarly, one or more operations of computing device 2 as described in this disclosure may be performed at computing device 10, rather than at computing device 2. In some examples, providing, for output in parallel at the audio device, may include a first computing device sending sounds to a second computing device that is operatively coupled to the audio device, such that the audio device outputs, in parallel, the first and second sounds received from the second computing device.

In some examples, as shown in FIG. 1, computing device 10 may be physically integrated with audio output devices 26. That is, computing device 10 and audio output device 26 may not be physically separate and may be physically incorporated into a common structure, such as smart headphones or other apparatus. In such examples, computing device 10 may be operatively coupled to audio output devices 26, such that computing device 10 may send audio signals for sounds to audio output devices 26 (e.g., using wireless communication or other suitable communication techniques).

In some examples, as shown in FIG. 1, computing device 10 may not be physically integrated with audio output devices 26. That is, computing device 10 and audio output device 26 may be physically separate and may not be physically incorporated into a common structure. In such examples, computing device 10 may still be operatively coupled to audio output devices 26, such that computing device 10 may send audio signals for sounds to audio output devices 26 (e.g., using wireless communication or other suitable communication techniques).

Figure 3:
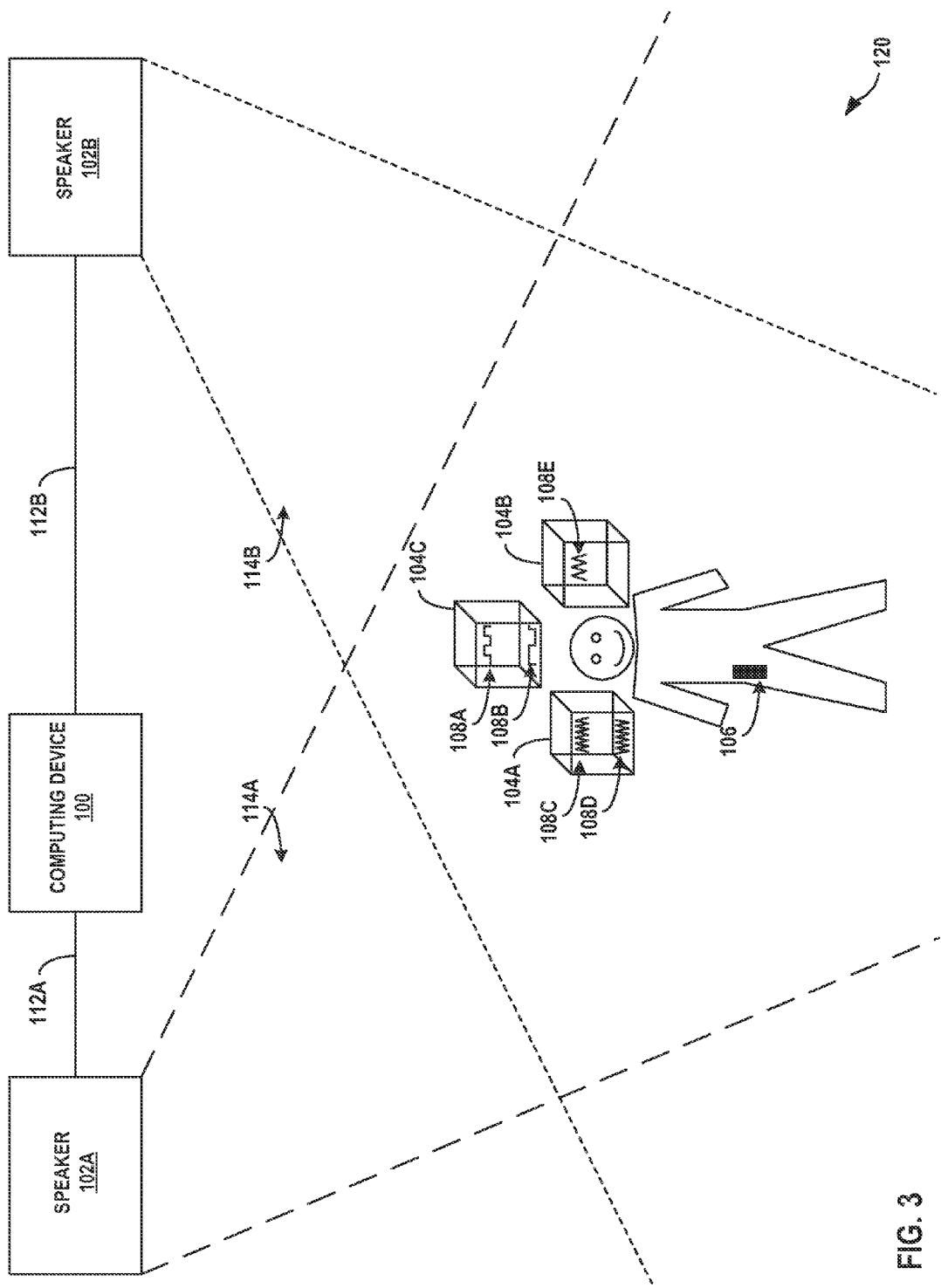
FIG. 3 is a conceptual diagram illustrating an example system that outputs sounds in multiple different spatial locations that may indicate one or more relationships between information associated with the sounds, in accordance with one or more aspects of the present disclosure.

FIG. 3 is a conceptual diagram illustrating an example system that outputs sounds in multiple distinct spatial locations that may indicate one or more relationships between information associated with the sounds, in accordance with one or more aspects of the present disclosure. Example system 120 may include speakers 102A-102B ("speakers 102"), computing device 100, and computing device 106. Although shown with two speakers 102A-102B ("speakers 102"), any number of speakers may be used. System 120 may be implemented in any number of environments including, but not limited to, in-vehicle automotive audio systems, stationary and/or semi-fixed audio systems (such as a conference room or household room audio system), etc. System 120 comprises a system in which the speakers 102 that output two or more sounds in parallel are not attached to the user. Instead, as further described in the example of FIG. 3, the computing device 100 may cause speakers 102 to project the two or more sounds to simulate localization of the sounds at spatial locations that are addressable by computing device 100. Each spatial location may be a different, respective location relative to a common reference point.

As shown in FIG. 3, system 120 includes computing device 100. Computing device 100 may include the same components as computing device 10 as shown in FIGS. 1-2. For instance, computing device 100 may include one or more communications units, an I/O module, an audio interface module, and audio data that are the same as similarly named components described in FIGS. 1-2. In some examples, computing device 100 may include additional components or fewer components than computing device 10 as described in FIGS. 1-2. Although shown as physically separate from speakers 120, in some examples, one or more of speakers 120 may include a computing device 100 attached to and/or integrated with the speaker. In some examples, each respective speaker may include such a computing device 100, while in other examples, fewer than all of the speakers 120 may include a computing device 100, although all speakers may be controllable the one or more of such speakers.

System 120 may also include computing device 106. Computing device 106 may include the same components as computing device 2 as shown in FIGS. 1-2. For instance, computing device 2 may include a user-interface device, one or more communications units, and one or more application modules that are the same as similarly named components described in FIGS. 1-2. In some examples, computing device 106 may include additional components or fewer components than computing device 2 as described in FIGS. 1-2. Although computing device 106 is shown as a smartphone at the body of the user (e.g., in a compartment of apparel worn by the user, or in the user's hand), any suitable computing device as described in FIGS. 1-2 may be used.

In the example of FIG. 3, computing device 100 and computing device 106 may send and receive data between the respective devices. Computing device 100 and computing device 106 may send and receive such data using wired, wireless, or a combination of wired and wireless communication. In some examples, computing device 100 and computing device 106 may send and receive data using one or more networks. As such, data sent from one computing device to another may traverse multiple intermediate computing devices in the network, such as routers, switches, etc. Examples of network communication may include but are not limited to TCP/IP over Ethernet, etc. In some examples, computing device 100 and computing device 106 may send and receive data using direct communication in which no intermediate computing devices send and receive data between the two endpoints (i.e., computing device 100 and computing device 106). Examples of direct communication may include but are not limited to Bluetooth®, Wi-Fi®, Near-Field Communication, etc.

System 120 may include one or more audio output devices, for example, speakers 102. Speakers 102 may be operatively coupled to computing device 100 by one or more links 112A-112B ("links 112"). Links 112 may be any wired, wireless, or combination of wired and wireless connections that carry sound information between computing device 100 and speakers 102. For instance, links 112A-112B may be physical wires that carry electrical signals representing sounds to output at speakers 102. Speakers 102 may include one or more electroacoustic transducers that each produces sound responsive to an electrical audio signal input. Speakers 102 may convert electrical signals to audio signals. For instance, an electrical signal representing a sound may be converted by speakers 102 to an audio signal, that when output may be perceptible by a human. In some examples, computing device 100 may include one or more output devices that convert digital representations of sounds into analog, electrical audio signal inputs to speakers 102, which in turn covert the audio signal inputs to audio signals.

Computing device 100 may control speakers 102 to simulate localization of sounds at one or more spatial locations. In some examples, computing device 100 may implement techniques for three-dimensional audio, which simulates localization of sounds at one or more spatial locations 104A-104C. Although described with respect to three-dimensional audio in FIG. 3, computing device 100 may implement any suitable techniques for simulating localization of sounds at one or more spatial locations 104A-104C.

In some examples, computing device 100 may address one or more spatial locations 104A-104C that are each relative to a common reference point. For instance, computing device 100 may maintain data that indicates respective, unique identifiers mapped to different respective, spatial locations. In this way, computing device 100, to simulate localization of a sound at a particular spatial location, may determine or select the unique identifier for the spatial location and cause the sound to be output such that the sound is simulated at the spatial location associated with the unique identifier. In some examples, computing device 100 outputs sounds in multiple different spatial locations that may indicate one or more relationships between information associated with the sounds. In some examples, each spatial location may be a different location of a three-dimensional coordinate system. A spatial location may be a single point, or alternatively, may be a three-dimensional region in the three-dimensional coordinate system, as illustrated in FIGS. 1 and 3.

In some examples, a reference point for the spatial locations may be a computing device attached to the user, such as a computing device included in a piece of apparel worn by the user, held in the hand of the user, and/or affixed to the user. In some examples, the reference point may be a computing device not attached to the user. In some examples, the reference point may be location that does not correspond to a computing device. For instance, the reference point may correspond to an object in an environment that also includes the user, and the object may not be a computing device. In the example of FIG. 3, the reference point for spatial locations 104A and 104B may be computing device 106.

In FIG. 3, using the example information of FIG. 1, computing device 100 may receive data from one or more other computing devices, such as computing device 106. For instance, computing device 100 may receive from computing device 106, data indicating a text message from Allison received at computing device 106. Upon receiving the data from computing device 106, computing device 100 may determine information included in the data.

Computing device 100 may provide a multi-dimensional audio interface in which a plurality of different spatial locations 104A-104C is defined. Each of the plurality of different spatial locations 104A-104C may be based on a common reference point and is uniquely identifiable by computing device 100. In some examples, the common reference point may be computing device 106. In other examples, the common reference point may be a user.

Computing device 100 may associate, in an audio interface, an information type with a first spatial location of the plurality of different spatial locations. The first information may be a new text message from a sender Allison. Computing device 106 may have received the text message and sent data to computing device 100 indicating the new text message from the sender Allison. As this was a communication from a sender Allison, the information type may be determined to be "a communication from a sender Allison." Computing device 100 may determine a first spatial location, and store data that indicates an association between the information type and first spatial location. Computing device 100 may also associate a first sound with the first information.

In the example of FIG. 3, responsive to determining that the first information is of the information type, one or more of speakers 102 may output, the first sound by simulating localization of the first sound at the first spatial location 104C of the plurality of different spatial locations 104A-104C. For instance, computing device 100 may send first sound 108A, as illustrated in FIG. 3, to one or more of speakers 102 for output at spatial location 104C.

Using three-dimensional audio techniques, computing device 100 may determine unique identifiers for spatial locations 104A, 104B, and 104C. Computing device 100, using the three-dimensional audio techniques and the unique identifiers, may send electrical signals to speakers 102A-102B to simulate localization of first sound 108A at spatial location 104C, second sound 108B at spatial location 104C, and third sound 108E at spatial location 104B. Speakers 102A-102B may output audio signals 114A from speaker 102A and audio signals 114B from speaker 102B to simulate localization of first sound 108A at spatial location 104C, second sound 108B at spatial location 104C, and third sound 108E at spatial location 104B. In some examples, the simulated localization of the sounds at specific spatial locations may be based on the intersection of audio signal 114A and 114B. Therefore, in the example of FIG. 3, although speakers 102 are not attached to the user or apparel of the user, speakers 102 may output, in parallel, the first and second sounds in the audio interface, such that the relationship between the first and second information is perceptible in the audio interface based at least in part on the spatial location at which the sounds are output at.

By outputting sounds 108A and 108B in the same spatial location, the user may determine multiple distinct indications of information are related. The relationship between the first information and second information in the example of FIG. 3 may be perceptible to the user in the audio interface based at least in part on the spatial location 104C at which both sounds are output. That is, the user may be able to determine that both a text message and a missed call were received from Allison because the tone of each of sounds 108A and 108B are output at the same location. The third sound 108E, which may be a social media update, may be output at a different spatial location 104B. In this way, the shared spatial location 104C indicates the relationship between the first information and the second information, while the different spatial location of third sound 108E indicates that a different notification has been received that is not of the information type shared by the first information and second information.

Computing device 100 may receive an indication of user input that selects the first information associated with first sound 108A. Based on hearing sound 108A from speakers 102, the user may select the sound to receive additional detail about the information indicated by the sound. Computing device 100 may receive may receive one or more indications of user input from the user. In the example of FIG. 3, audio interface module 16 may receive an indication of user input from computing device 106 that the user has selected information indicating the text message from Allison. Computing device 106, for instance, may output for display a graphical user interface that indicates the first information to select. Computing device 106 may receive an indication of user input (e.g., corresponding to a tap at a location of an input device), to select first information associated with first sound 108A. In another example, an indication of user input could involve a rotation of the user's head, as described with respect to FIG. 4.

In accordance with techniques of the disclosure, computing device 100 and/or 106 may perform, based at least in part on the indication of user input, at least one operation corresponding to the user's selection. For example, computing device 100 and/or 106 may select information associated with the sound based on the user input. For instance, computing device 100 and/or 106 may cause speakers 102 to output verbal sound that includes a transcript of the text message from Allison and/or metadata about the text message, such as date received, date sent, subject, recipient(s), sender, etc. In an alternative example, computing device 100 and/or 106 may cause and output device of computing device 106 to output a transcript of the text message from Allison and/or metadata about the text message, such as date received, date sent, subject, recipient(s), sender, etc. In general, an operation may refer to any one or more actions that can be taken by one or more of computing device 100, computing device 106 and/or other computing devices.

Although computing device 106 is shown in FIG. 3 as attached to the user, in some examples, computing device 106 may not be included in system 120. That is, computing device 100 may simulate localization of sounds at spatial locations without computing device 106. For instance, computing device 100 may include a camera or other input device that can determine various features and/or portions of the user's body. Consequently, computing device 100, based on identifying the user's head, as one example, may simulate localization of sounds at various spatial locations. In this way, computing device 100 and speakers 102 may provide an audio interface that outputs sounds in parallel without the user necessarily requiring a computing device attached to the user or apparel of the user.

As described above, in one example, system 120 of FIG. 3 could be an in-vehicle automotive audio system. In such an example, computing device 100 and/or computing device 106 may be integrated in an automobile. Information received may be directions from a navigation system, and the information type may be a navigation instruction. The first spatial location of the plurality of different spatial locations may then be in a direction towards which a navigation maneuver must be completed. For example, a navigation instruction may be that the user must turn left in 500 yards. Computing device 100 may cause speakers 102A and/or 102B to output a sound simulating localization at a first spatial location, which may be a point 500 yards ahead and slightly to the left of the user, or as if it is coming from the point at which the user must turn left into. As the user approaches the intersection at which the left turn must be made, computing device 100 may cause speakers 102A and/or 102B to continue outputting the sound simulating localization at the first spatial location, which is still the point at which the user must turn left into, but which is now closer to directly left of the user rather than 500 yards ahead ad slightly to the left of the user. This may continue until the point at which the user must turn left, where the sound will now be output at a location directly to the left of the user. Computing device 100 may further alter perceptual properties of the sound throughout the navigation process, such as outputting the sound at a higher volume as the user approaches the intersection at which a turn must be completed, or outputting the sound at a higher pitch or a faster tempo as the user approaches the intersection at which a turn must be completed.

In the case of navigation, spatialized sound has an advantage of matching up nicely with the real world, so that any audio content may become a navigation aid. In one example, a user may be listening to an audio cast as the user is walking towards a meeting across town. There may be no need to interrupt the podcast with an navigation instruction telling the user to turn left at the next intersection. Instead, techniques of this disclosure may place the source of the podcast audio at the user's desired destination so that as the user approaches a left turn, the source audibly shifts towards the left for algorithmic holophonic sound generation. Adjusting the user's head back to normal and the user may return to a normal sound experience.

Figure 4A:
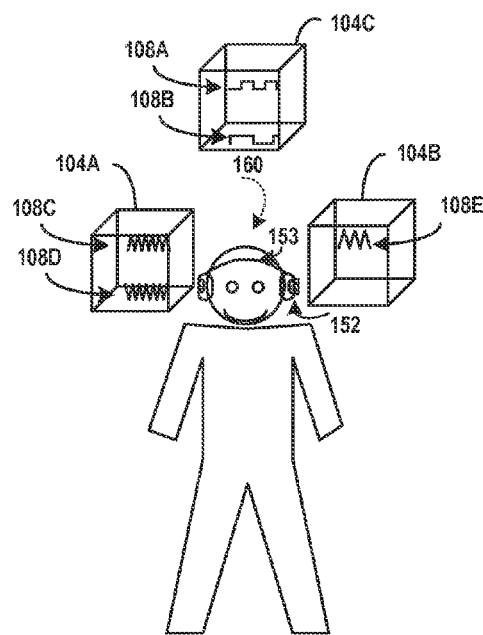
FIGS. 4A-4C are conceptual diagrams illustrating navigation for an audio interface that includes sounds output in various spatial locations, which may indicate one or more relationships between information associated with the sounds, in accordance with one or more aspects of the present disclosure.
Figure 4B:
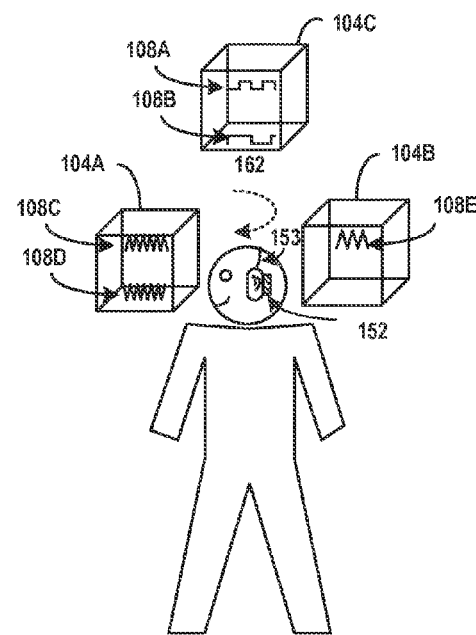
Figure 4C:
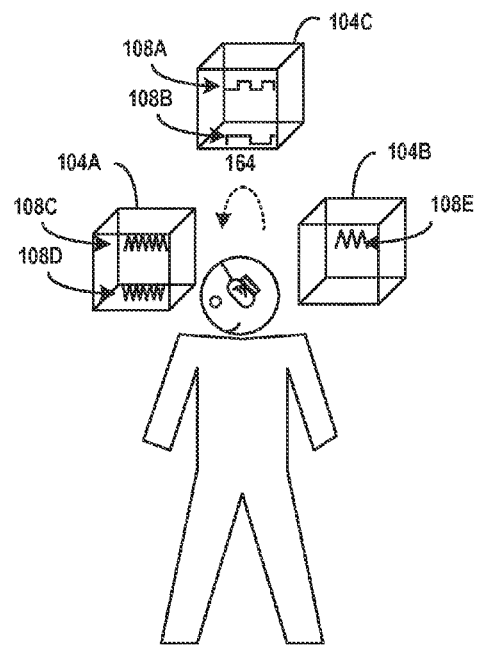

FIGS. 4A-4C are conceptual diagrams illustrating navigation for an audio interface that includes sounds output in various spatial locations, which may indicate one or more relationships between information associated with the sounds, in accordance with one or more aspects of the present disclosure.

In the example of FIG. 4A, a user may have a wearable apparatus 153 attached to the user's body or apparel of the user. Wearable apparatus 153 may be any wearable apparatus described in FIGS. 1-3. Wearable apparatus 153 may include a computing device 152. Computing device 152 may be any suitable computing device as described in FIGS. 1-3. For instance, computing device 152 may be the same as computing device 10 in FIGS. 1-2. In accordance with techniques of the disclosure as described in FIGS. 1-3 and 5, wearable apparatus may output any of sounds 108A-108E in spatial locations 104A-104C. Wearable apparatus 153 may output sounds 108A and 108B such that the sounds appear to come from above the user when the user is looking forward (spatial location 104C). Wearable apparatus 153 may output sounds 108C and 108D such that the sound appears to come from the right-hand side of the user when the user is looking forward (spatial location 104A). Wearable apparatus 153 may output sound 108E such that the sound appears to come from the left-hand side of the user when the user is looking forward (spatial location 104B). In some examples, wearable apparatus 153 may receive one or more indications of user input comprising one or more head turn gestures of a user. A head turn gesture may be motion of a user's head in a particular direction. The movement may be rotational, linear, or some combination of rotational and linear movement. The movement may occur in one or more directions of a three-dimensional space.

In some examples of this disclosure, each of the plurality of different spatial locations may be relative to the common reference point. For instance, in the example of FIG. 4A, the common reference point may be wearable apparatus 153 or computing device 152.

In one example, wherein the plurality of different spatial locations is a first plurality of different spatial locations, computing device 152 may detect a movement of at least a portion of the user relative to the common reference point and associate the information type with a first spatial location of a second plurality of different spatial locations. The first spatial location of the second plurality of different spatial locations may be different than the first spatial location of the first plurality of spatial locations. Each of the second plurality of different spatial locations may be based on the common reference point and is uniquely identifiable by the computing device. The first spatial location of the second plurality of different spatial locations may be located in a relative position to at least the portion of the user that is the same as a relative position of the first spatial location of the first plurality of different spatial locations to at least the portion of the user before the movement of at least the portion of the user relative to the common reference point. In other words, the plurality of different spatial locations may move with the common reference point. For instance, if the user is looking forward, spatial location 104A may be on the right-hand side of the user's head. If the user rotates their head 90 degrees to the right while wearing wearable apparatus 153, spatial location 104A may also rotate 90 degrees to the right along with the user's head so that sound output by wearable apparatus 153 notifying the user of information received of the information type associated with spatial location 104A still appears to come from the right-hand side of the user's rotated head.

In the examples where the different spatial locations move with the common reference point, the user may have to perform a "clutching" technique in order to anchor the spatial locations. For the purposes of this disclosure, generally, anchoring may refer to fixing the sound at a particular spatial location As an example of the clutching technique, the user may perform an action that causes the spatial locations at which sounds are output to no longer move with respect to the common reference point, thereby allowing the user to rotate their head in the necessary manner to choose an option related to the spatial locations. In the example of FIGS. 4A-4C, this clutching action, or indication of user input, is a head nod. In other examples, this clutching action, or indication of user input, may be a different head movement, a tactile input of pressing or holding a button or a touch-sensitive user interface, or any other suitable technique for indicating a selection, on either wearable apparatus 153, computing device 152, or some other computing device coupled to wearable apparatus 153 or computing device 152. In other examples, a clutching action may be another motion of the user's body detected by wearable apparatus 153, computing device 152 or some other computing device, such as a smartwatch or a camera.

In accordance with techniques of the disclosure, if the user wishes to further investigate multiple sounds 108C and 108D on her right-hand side, she may initially perform a head nod 160. Computing device 152, using one or more sensors (e.g., an accelerometer and/or gyrometer that determines the motion), may determine head nod 160 and receive head nod 160 as a first indication of user input. Computing device 152 may determine that head nod 160 corresponds to a clutching indication.

Computing device 152 may determine, based at least in part on a direction of the head nod gesture, to anchor the information type "e-mails" at the spatial location 104A, anchor the information type "social media communications" at the spatial location 104B, and anchor the information type "communications from Allison" at the spatial location 104C. In other words, responsive to the first indication of user input (head nod 160), spatial locations 104A-104C may no longer move relative to movements of the common reference point and may stay locked in their current position at the time the user performs head nod 160, thus allowing the user to navigate the menu presented by the multi-dimensional audio interface.

As shown by FIG. 4B, computing device 152 may detect a rotation of at least a portion of the user. For example, the user may perform a right-handed head turn 162. As shown by FIG. 4B, spatial locations 104A-104C do not move with respect to the common reference point during right-handed head turn 162, as they were anchored to their previous position as a result of head nod 160.

As shown by FIG. 4C, computing device 152 may receive a second indication of user input. The second indication of user input may be similar to the first indication of user input, or the clutching action. In this example, the second indication of user input is head nod 164. In other examples, this second indication of user input, or an unclutching action, may be a different head movement, a tactile input of pressing or releasing a button or a touch-sensitive user interface, or any other suitable technique for indicating a selection, on either wearable apparatus 153, computing device 152, or some other computing device coupled to wearable apparatus 153 or computing device 152, or another motion of the user's body detected by wearable apparatus 153, computing device 152 or some other computing device, such as a smartwatch or a camera.

Responsive to this second indication of user input, computing device 152 may determine a direction that at least the portion of the user is facing. In some examples, computing device 152 may use the accelerometer and/or gyrometer data to determine any rotations of at least the portion of the user detected above to determine a new direction that at least the portion of the user is facing. In the example of FIG. 4C, the accelerometer and/or gyrometer data may determine that the user is now facing 90 degrees to the right of the initial direction the user was looking, or towards spatial location 104A.

In some examples in accordance with techniques of this disclosure, responsive to detecting the rotation of at least the portion of the user, computing device 152 may determine which spatial location of the plurality of different spatial locations at least the portion of the user is facing. In the example of FIG. 4C, computing device 152 detected that the user is facing 90 degrees to the right of the initial direction the user was looking, or towards spatial location 104A. Computing device 152 may output, using the audio output device (e.g., speakers 26A-26B, speakers 102A-102B, or wearable apparatus 153) an audio identification associated with the information type associated with the spatial location at least the portion of the user is facing, wherein the audio identification is a sound that uniquely identifies the information type associated with the spatial location at least the portion of the user is facing. For instance, as described above, spatial location 104A is associated with the information type "emails". Therefore, computing device 152 may output, using the audio output device, an audio identification identifying spatial location 104A and the information type "emails," such as a verbal sound that says the word "emails." In other examples, the audio identification may be a non-verbal tone that is distinct for spatial location 104A.

Computing device 152 may select an information type of the plurality of different information types that is associated with the spatial location closest to the direction that the user is facing. In the example of FIG. 4C, computing device 152 detected that the user is facing 90 degrees to the right of the initial direction the user was looking, or towards spatial location 104A. As described above, spatial location 104A is associated with the information type "emails". Therefore, computing device 152 may select the information type emails based on that direction. In some examples, this may cause computing device 152 to navigate a menu hierarchy, as described below.

Responsive to performing the head nod 164, computing device 152 may cause wearable apparatus 153 to output verbal sound, corresponding to information associated with sound 108C, that includes a transcript of the email from Nick and/or metadata about the email, such as date received, date sent, subject, recipient(s), sender, etc. In this way, techniques of the disclosure may enable a computing device to initially output sounds in different spatial locations that are associated with related information types, and the user may navigate through the sounds to obtain greater detail about information associated with one or more of the sounds.

In some examples in accordance with techniques of this disclosure, responsive to receiving the indication of user input that selects the first information (i.e., head nod 164), a second multi-dimensional audio interface may be provided in which a second plurality of different spatial locations is defined, wherein each of the second plurality of different spatial locations is based on a common reference point and is uniquely identifiable by computing device 152. In some examples, the second plurality of different spatial locations may be the same as the first plurality of different spatial locations. In other examples, the second plurality of different spatial locations may be different, wholly or partially, from the first plurality of different spatial locations.

Computing device 152 may associate a second information type with a first spatial location of the second plurality of different spatial locations, the second information type included in a second plurality of different information types. Responsive to determining that second information is of the second information type, computing device 152 may output, using the audio output device (e.g., speakers 26A-26B, speakers 102A-102B, or wearable apparatus 153) and simulating localization of sound at the first spatial location of the second plurality of different spatial locations, a second sound that indicates the second information.

Using the example of FIGS. 4A-4C, the user may first select the information type "emails". Second information type may be an indication of which email address the email was sent to. For instance, sound 108C may indicate an email from Nick, which may be sent to a personal email account. Sound 108D, however, may indicate an email from work, which may be sent to a business email account. Both sounds, however, originate from spatial location 104A in FIGS. 4A-4C. After selecting the "email" information type, computing device 152 may associate a spatial location on the right-hand side of the user with the information type "personal email" and a spatial location on the left-hand side of the user with the information type "work email." Therefore, a sound originating on the right-hand side of the user may indicate an email was received by the user's personal email account, while a sound originating on the left-hand side of the user may indicate an email was received by the user's business email account.

In another example, upon selecting the first information and the "emails" information type, the user may be presented second information types that comprise options of how to handle the first information. For instance, if the user wants the email to be read to them, a "read" option may be a second information type associated with a spatial location on the right-hand side of the user. If the user wants to reply to the email, a "reply" option may be a second information type associated with a spatial location on the left-hand side of the user. If the user wants to forward the email, a "forward" option may be a second information type associated with a spatial location above the user. If the user wants to delete the email, a "delete" option may be a second information type associated with a spatial location at a 30 degree angle above the user's line of sight. In other examples, other options may be presented based on the first information type or options may be presented at different spatial locations.

Figure 5:
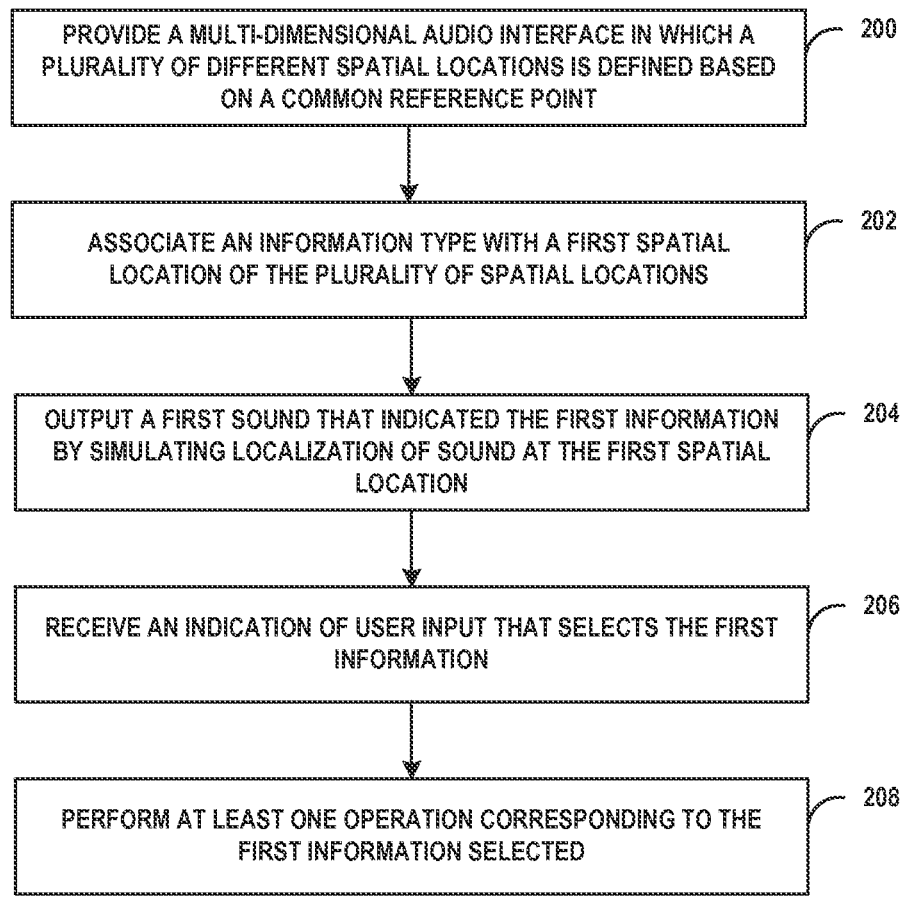
FIG. 5 is a flow diagram illustrating example operations of a computing device that implements techniques for outputting, in an audio user interface, sounds in various spatial locations, which may indicate one or more relationships between information associated with the sounds, in accordance with one or more aspects of the present disclosure.

FIG. 5 is a flow diagram illustrating example operations of a computing device that implements techniques for outputting, in an audio user interface, sounds in various spatial locations, which may indicate one or more relationships between information associated with the sounds, in accordance with one or more aspects of the present disclosure. For purposes of illustration only, the example operations are described below within the context of computing device 10, as shown in FIGS. 1 and 2.

In the particular example of FIG. 5, computing device 10 may initially receive data that includes information indicating, for instance, a text message from Allison (first information). Computing device 10 may provide a multi-dimensional audio interface in which a plurality of different spatial locations 34A-34C is defined, wherein each of the plurality of different spatial locations 34A-34C is based on a common reference point and is uniquely identifiable by computing device 10 (200).

Computing device may associate an information type (i.e., communications from Allison) with a first spatial location 34C of the plurality of different spatial locations, the information type included in a plurality of different information types (202). Computing device 10 and/or audio interface module 16 may store data that indicates an association between the first information type and the first spatial location.

In the example of FIG. 5, computing device 10 may determine that the first information (i.e., the text message from Allison) is of the information type (communications from Allison). Responsive to this determination, computing device 10 may output, using an audio output device (e.g., speakers 26A and 26B) and simulating localization of sound at the first spatial location 34C of the plurality of different spatial locations, a first sound 28A that indicates the first information (204).

Computing device 10 may receive an indication of user input that selects at the first information associated with the first sound (206). Based on hearing the first sound at the first spatial location, the user may select the sound to receive additional detail about the information indicated by the sound. For example, computing device 10 may perform, based at least in part on the indication of user input, at least one operation corresponding to the first information (208). For example, computing device 10 may select information associated with the sound based on the user input.

Example 1

A method comprising providing a multi-dimensional audio interface in which a plurality of different spatial locations is defined, wherein each of the plurality of different spatial locations is based on a common reference point and is uniquely identifiable by a computing device; associating, by the computing device, an information type with a first spatial location of the plurality of different spatial locations, the information type included in a plurality of different information types; responsive to determining that first information is of the information type, outputting, using an audio output device and simulating localization of sound at the first spatial location of the plurality of different spatial locations, a first sound that indicates the first information; receiving an indication of user input that selects the first information; and performing at least one operation corresponding to the first information selected based at least in part on the indication of user input.

Example 2

The method of example 1, further comprising, responsive to determining that second information is of the same information type associated with the first spatial location, outputting, using the audio output device and simulating localization of sound at the first spatial location of the plurality of different spatial locations, a second sound that indicates the second information.

Example 3

The method of any of examples 1 or 2, wherein the information type is a first information type, the method further comprising associating, by the computing device, a second information type with a second spatial location of the plurality of different spatial locations, the second information type included in the plurality of different information types; and responsive to determining that second information is of the second information type, outputting, using the audio output device and simulating localization of a second sound at the second spatial location of the plurality of different spatial locations, the second sound indicating the second information.

Example 4

The method of any of examples 1-3, wherein each of the plurality of different spatial locations are relative to the common reference point.

Example 5

The method of example 4, wherein the plurality of different spatial locations is a first plurality of different spatial locations, the method further comprising detecting, by the computing device, a movement of at least a portion of the user relative to the common reference point; and associating, by the computing device, the information type with a first spatial location of a second plurality of different spatial locations, the first spatial location of the second plurality of different spatial locations being different than the first spatial location of the first plurality of spatial locations, wherein each of the second plurality of different spatial locations is based on the common reference point and is uniquely identifiable by the computing device, and wherein the first spatial location of the second plurality of different spatial locations is located in a relative position to at least the portion of the user that is the same as a relative position of the first spatial location of the first plurality of different spatial locations to at least the portion of the user before the movement of at least the portion of the user relative to the common reference point.

Example 6

The method of any of examples 4 or 5, wherein receiving an indication of user input that selects the first information comprises receiving a first indication of user input; anchoring, by the computing device, the information type at the first spatial location of the plurality of different spatial locations; detecting, by the computing device, a rotation of at least a portion of the user; receiving a second indication of user input; determining, by the computing device, a direction that at least the portion of the user is facing; and selecting, by the computing device, an information type of the plurality of different information types that is associated with the spatial location closest to the direction that the user is facing.

Example 7

The method of example 6, further comprising responsive to detecting the rotation of at least the portion of the user, determining, by the computing device, which spatial location of the plurality of different spatial locations at least the portion of the user is facing; and outputting, using the audio output device, an audio identification associated with the information type associated with the spatial location at least the portion of the user is facing, wherein the audio identification is a sound that uniquely identifies the information type associated with the spatial location at least the portion of the user is facing.

Example 8

The method of any of examples 1-7, further comprising, responsive to receiving the indication of user input that selects the first information, providing a second multi-dimensional audio interface in which a second plurality of different spatial locations is defined, wherein each of the second plurality of different spatial locations is based on the common reference point and is uniquely identifiable by the computing device; associating, by the computing device, a second information type with a first spatial location of the second plurality of different spatial locations, the second information type included in a second plurality of different information types; and responsive to determining that second information is of the second information type, outputting, using the audio output device and simulating localization of sound at the first spatial location of the second plurality of different spatial locations, a second sound that indicates the second information.

Example 9

The method of any of examples 1-8, wherein the information type indicates at least one of a sender identification or a content identification, and wherein determining that the first information is of the information type comprises determining, by the computing device, a source characteristic for the first information, wherein the source characteristic indicates at least one of a sender identification or a content identification; comparing, by the computing device, the source characteristic of the first information to a plurality of information types that includes the information type, at least one of the plurality of information types indicating at least one of the sender identification or the content identification; determining, based at least in part on the comparing, that the first information is of the information type.

Example 10

The method of any of examples 1-9, wherein the computing device is integrated in an automobile, wherein the information type is a navigation instruction, and wherein the first spatial location of the plurality of different spatial locations is in a direction towards which a navigation maneuver must be completed.

Example 11

A computing device comprising at least one processor; and at least one module, operable by the at least one processor to provide a multi-dimensional audio interface in which a plurality of different spatial locations is defined, wherein each of the plurality of different spatial locations is based on a common reference point and is uniquely identifiable by a computing device; associate, for the multi-dimensional audio interface, an information type with a first spatial location of the plurality of different spatial locations, the information type included in a plurality of different information types; responsive to determining that first information is of the information type, output, using an audio output device and simulating localization of sound at the first spatial location of the plurality of different spatial locations, a first sound that indicates the first information; receive an indication of user input that selects the first information; and perform at least one operation corresponding to the first information selected based at least in part on the indication of user input.

Example 12

The computing device of example 11, wherein the at least one module is further operable by the at least one processor to responsive to determining that second information is of the same information type associated with the first spatial location, output, using the audio output device and simulating localization of sound at the first spatial location of the plurality of different spatial locations, a second sound that indicates the second information.

Example 13

The computing device of any of examples 11 or 12, wherein the information type is a first information type, and wherein the at least one module is further operable by the at least one processor to associate a second information type with a second spatial location of the plurality of different spatial locations, the second information type included in the plurality of different information types; and responsive to determining that second information is of the second information type, output, using the audio output device and simulating localization of a second sound at the second spatial location of the plurality of different spatial locations, the second sound indicating the second information.

Example 14

The computing device of any of examples 11-13, wherein each of the plurality of different spatial locations are relative to the common reference point.

Example 15

The computing device of example 14, wherein the plurality of different spatial locations is a first plurality of different spatial locations, and wherein the at least one module is further operable by the at least one processor to detect a movement of at least a portion of the user relative to the common reference point; and associate the information type with a first spatial location of a second plurality of different spatial locations, the first spatial location of the second plurality of different spatial locations being different than the first spatial location of the first plurality of spatial locations, wherein each of the second plurality of different spatial locations is based on the common reference point and is uniquely identifiable by the computing device, and wherein the first spatial location of the second plurality of different spatial locations is located in a relative position to at least the portion of the user that is the same as a relative position of the first spatial location of the first plurality of different spatial locations to at least the portion of the user before the movement of at least the portion of the user relative to the common reference point.

Example 16

The computing device of any of examples 14 or 15, wherein the at least one module being operable to receive an indication of user input that selects the first information comprises the at least one module being operable by the at least one processor to receive a first indication of user input; anchor the information type at the first spatial location of the plurality of different spatial locations; detect a rotation of at least a portion of the user; receive a second indication of user input; determine a direction that at least the portion of the user is facing; and select an information type of the plurality of different information types that is associated with the spatial location closest to the direction that the user is facing.

Example 17

The computing device of example 16, wherein the at least one module is further operable by the at least one processor to responsive to detecting the rotation of at least the portion of the user, determine which spatial location of the plurality of different spatial locations at least the portion of the user is facing; and output, using the audio output device, an audio identification associated with the information type associated with the spatial location at least the portion of the user is facing, wherein the audio identification is a sound that uniquely identifies the information type associated with the spatial location at least the portion of the user is facing.

Example 18

The computing device of any of examples 11-17, wherein the at least one module is further operable by the at least one processor to, responsive to receiving the indication of user input that selects the first information, provide a second multi-dimensional audio interface in which a second plurality of different spatial locations is defined, wherein each of the second plurality of different spatial locations is based on a common reference point and is uniquely identifiable by a computing device; associate a second information type with a first spatial location of the second plurality of different spatial locations, the second information type included in a second plurality of different information types; and responsive to determining that second information is of the second information type, output, using the audio output device and simulating localization of sound at the first spatial location of the second plurality of different spatial locations, a second sound that indicates the second information.

Example 19

The computing device of any of examples 11-18, wherein the computing device is integrated into one of a headphones, a headband, an earpiece, an eyepiece, or eyeglasses.

Example 20

A computer-readable storage medium encoded with instructions that, when executed, cause at least one processor of a computing device to provide a multi-dimensional audio interface in which a plurality of different spatial locations is defined, wherein each of the plurality of different spatial locations is based on a common reference point and is uniquely identifiable by a computing device; associate, for the multi-dimensional audio interface, an information type with a first spatial location of the plurality of different spatial locations, the information type included in a plurality of different information types; responsive to determining that first information is of the information type, output, using an audio output device and simulating localization of sound at the first spatial location of the plurality of different spatial locations, a first sound that indicates the first information; receive an indication of user input that selects the first information; and perform at least one operation corresponding to the first information selected based at least in part on the indication of user input.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. These and other examples are within the scope of the following claims.

The invention claimed is:

1. A method comprising:
providing a multi-dimensional audio interface in which a first plurality of different spatial locations is defined, wherein each of the first plurality of different spatial locations is relative to a common reference point and is uniquely identifiable by a computing device, wherein the common reference point relates to a portion of a user or a sensor attached to the portion of the user;
associating, by the computing device, an information type with a first spatial location of the first plurality of different spatial locations, the information type included in a plurality of different information types;
responsive to determining that first information is of the information type, outputting, using an audio output device and while simulating localization of sound at the first spatial location of the first plurality of different spatial locations, a first sound that indicates the first information;
receiving an indication of first user input;
responsive to receiving the indication of first user input, anchoring, by the computing device, the information type at the first spatial location of the first plurality of different spatial locations to a first spatial location of a second plurality of different spatial locations, the first spatial location of the second plurality of different spatial locations being relative to an environment surrounding the user, wherein the first spatial location of the second plurality of different spatial locations corresponds to a current location of the first spatial location of the first plurality of different spatial locations within the environment at the time of receiving the indication of the first user input;
after receiving the indication of the first user input, detecting, by the computing device, a rotation of the portion of the user;
subsequent to detecting the rotation of the portion of the user, receiving an indication of second user input;
determining, by the computing device, based on the rotation of the portion of the user, a direction that the user is facing;
responsive to determining that the first spatial location of the second plurality of different spatial locations is a closest spatial location from the second plurality of different spatial locations to the direction that the user is facing, selecting, by the computing device and based at least in part on the indication of second user input, the information type; and
performing at least one operation corresponding to the first information selected based at least in part on the indication of second user input.

2. The method of claim 1, further comprising:
responsive to determining that second information is of the same information type associated with the first spatial location of the first plurality of different spatial locations, outputting, using the audio output device and while simulating localization of sound at the first spatial location of the first plurality of different spatial locations, a second sound that indicates the second information.

3. The method of claim 1, wherein the information type is a first information type, the method further comprising:
associating, by the computing device, a second information type with a second spatial location of the first plurality of different spatial locations that is different than the first spatial location of the first plurality of different spatial locations, the second information type included in the plurality of different information types; and
responsive to determining that second information is of the second information type, outputting, using the audio output device and while simulating localization of a second sound at the second spatial location of the first plurality of different spatial locations, the second sound indicating the second information.

4. The method of claim 1, the method further comprising:
detecting, by the computing device, a movement of at least a portion of the user relative to the common reference point; and
associating, by the computing device, the information type with a first spatial location of a third plurality of different spatial locations, the first spatial location of the third plurality of different spatial locations being different than both the first spatial location of the first plurality of different spatial locations and the first spatial location of the second plurality of different spatial locations,
wherein each of the third plurality of different spatial locations is relative to the common reference point and is uniquely identifiable by the computing device, and
wherein the first spatial location of the third plurality of different spatial locations is located at a relative position to at least the portion of the user that is the same as a relative position of the first spatial location of the first plurality of different spatial locations to at least the portion of the user before the movement of at least the portion of the user relative to the common reference point.

5. The method of claim 1, further comprising:
responsive to detecting the rotation of at least the portion of the user, determining, by the computing device, which spatial location of the second plurality of different spatial locations the user is facing; and
outputting, using the audio output device, an audio identification associated with the information type associated with the spatial location of the second plurality of different spatial locations at which the user is facing, wherein the audio identification is a sound that uniquely identifies the information type associated with the spatial location of the second plurality of different spatial locations at which the user is facing.

6. The method of claim 1, further comprising:
responsive to receiving the indication of user input that selects the first information:
providing a second multi-dimensional audio interface in which a third plurality of different spatial locations is defined, wherein each of the third plurality of different spatial locations is relative to the common reference point and is uniquely identifiable by the computing device;
associating, by the computing device, a second information type with a first spatial location of the third plurality of different spatial locations, the second information type included in a second plurality of different information types; and
responsive to determining that second information is of the second information type, outputting, using the audio output device and while simulating localization of sound at the first spatial location of the third plurality of different spatial locations, a second sound that indicates the second information.

7. The method of claim 1, wherein the information type indicates at least one of a sender identification or a content identification, and wherein determining that the first information is of the information type comprises:
determining, by the computing device, a source characteristic for the first information, wherein the source characteristic indicates at least one of a sender identification or a content identification;
comparing, by the computing device, the source characteristic of the first information to a plurality of information types that includes the information type, at least one of the plurality of information types indicating at least one of the sender identification or the content identification;
determining, based at least in part on the comparing, that the first information is of the information type.

8. The method of claim 1, wherein the direction the user is facing is a first direction, wherein the computing device is integrated in an automobile, wherein the information type is a navigation instruction, and wherein the first spatial location of the first plurality of different spatial locations is in a second direction towards which a navigation maneuver must be completed.

9. The method of claim 1, wherein the first user input comprises a head nod by the user.

10. The method of claim 9, wherein the head nod comprises a first head nod, and wherein the second user input comprises a second head nod by the user in a different direction than the first head nod.

11. The method of claim 1, wherein the indication of the first user input is different than and separate from the indication of the second user input.

12. A computing device comprising:
at least one processor; and
at least one module, operable by the at least one processor to:
provide a multi-dimensional audio interface in which a first plurality of different spatial locations is defined, wherein each of the first plurality of different spatial locations is relative to a common reference point and is uniquely identifiable by a computing device, wherein the common reference point relates to a portion of a user or a sensor attached to the portion of the user;
associate, for the multi-dimensional audio interface, an information type with a first spatial location of the first plurality of different spatial locations, the information type included in a plurality of different information types;
responsive to determining that first information is of the information type, output, using an audio output device and while simulating localization of sound at the first spatial location of the first plurality of different spatial locations, a first sound that indicates the first information;
receive an indication of first user input;
responsive to receiving the indication of first user input, anchor the information type at the first spatial location of the first plurality of different spatial locations to a first spatial location of a second plurality of different spatial locations, the first spatial location of the second plurality of different spatial locations being relative to an environment surrounding the user, wherein the first spatial location of the second plurality of different spatial locations corresponds to a current location of the first spatial location of the first plurality of different spatial locations within the environment at the time of receiving the indication of the first user input;
after receiving the indication of the first user input, detect a rotation of the portion of the user;
subsequent to detecting the rotation of the portion of the user, receive an indication of second user input
determine, based on the rotation of the portion of the user, a direction that the user is facing;
responsive to determining that the first spatial location of the second plurality of different spatial locations is a closest spatial location from the second plurality of different spatial locations to the direction that the user is facing, select, based at least in part on the indication of second user input, the information type; and
perform at least one operation corresponding to the first information selected based at least in part on the indication of second user input.

13. The computing device of claim 12, wherein the at least one module is further operable by the at least one processor to:
responsive to determining that second information is of the same information type associated with the first spatial location of the first plurality of different spatial locations, output, using the audio output device and while simulating localization of sound at the first spatial location of the first plurality of different spatial locations, a second sound that indicates the second information.

14. The computing device of claim 12, wherein the information type is a first information type, and wherein the at least one module is further operable by the at least one processor to:
  associate a second information type with a second spatial location of the first plurality of different spatial locations that is different than the first spatial location of the first plurality of different spatial locations, the second information type included in the plurality of different information types; and
  responsive to determining that second information is of the second information type, output, using the audio output device and while simulating localization of a second sound at the second spatial location of the first plurality of different spatial locations, the second sound indicating the second information.

15. The computing device of claim 12, and wherein the at least one module is further operable by the at least one processor to:
  detect a movement of at least a portion of the user relative to the common reference point; and
  associate the information type with a first spatial location of a third plurality of different spatial locations, the first spatial location of the third plurality of different spatial locations being different than both the first spatial location of the first plurality of different spatial locations and the first spatial location of the second plurality of different spatial locations, wherein each of the third plurality of different spatial locations is relative to the common reference point and is uniquely identifiable by the computing device, and wherein the first spatial location of the third plurality of different spatial locations is located at a relative position to at least the portion of the user that is the same as a relative position of the first spatial location of the first plurality of different spatial locations to at least the portion of the user before the movement of at least the portion of the user relative to the common reference point.

16. The computing device of claim 12, wherein the at least one module is further operable by the at least one processor to:
  responsive to detecting the rotation of at least the portion of the user, determine which spatial location of the second plurality of different spatial locations at least the portion of the user is facing; and
  output, using the audio output device, an audio identification associated with the information type associated with the spatial location of the second plurality of different spatial locations at which the user is facing, wherein the audio identification is a sound that uniquely identifies the information type associated with the spatial location of the second plurality of different spatial locations at which the user is facing.

17. The computing device of claim 12, wherein the at least one module is further operable by the at least one processor to:
  responsive to receiving the indication of user input that selects the first information:
    provide a second multi-dimensional audio interface in which a third plurality of different spatial locations is defined, wherein each of the third plurality of different spatial locations is relative to the common reference point and is uniquely identifiable by the computing device;
    associate a second information type with a first spatial location of the third plurality of different spatial locations, the second information type included in a second plurality of different information types; and
    responsive to determining that second information is of the second information type, output, using the audio output device and while simulating localization of sound at the first spatial location of the third plurality of different spatial locations, a second sound that indicates the second information.

18. The computing device of claim 12, wherein the computing device is integrated into one of a headphones, a headband, an earpiece, an eyepiece, or eyeglasses.

19. A computer-readable storage medium encoded with instructions that, when executed, cause at least one processor of a computing device to:
  provide a multi-dimensional audio interface in which a first plurality of different spatial locations is defined, wherein each of the first plurality of different spatial locations is relative to a common reference point and is uniquely identifiable by a computing device, wherein the common reference point relates to a portion of a user or a sensor attached to the portion of the user;
  associate, for the multi-dimensional audio interface, an information type with a first spatial location of the first plurality of different spatial locations, the information type included in a plurality of different information types;
  responsive to determining that first information is of the information type, output, using an audio output device and while simulating localization of sound at the first spatial location of the first plurality of different spatial locations, a first sound that indicates the first information;
  receive an indication of first user input;
  responsive to receiving the indication of first user input, anchor the information type at the first spatial location of the first plurality of different spatial locations to a first spatial location of a second plurality of different spatial locations, the first spatial location of the second plurality of different spatial locations being relative to an environment surrounding the user, wherein the first spatial location of the second plurality of different spatial locations corresponds to a current location of the first spatial location of the first plurality of different spatial locations within the environment at the time of receiving the indication of the first user input;
  after receiving the indication of the first user input, detect a rotation of the portion of the user;
  subsequent to detecting the rotation of the portion of the user, receive an indication of second user input;
  determine, based on the rotation of the portion of the user, a direction that the user is facing;
  responsive to determining that the first spatial location of the second plurality of different spatial locations is a closest spatial location from the second plurality of different spatial locations to the direction that the user is facing, select, based at least in part on the indication of second user input, the information type; and
  perform at least one operation corresponding to the first information selected based at least in part on the indication of second user input.

* * * * *